United States Patent [19]

Marfurt et al.

[11] Patent Number: 5,940,778
[45] Date of Patent: Aug. 17, 1999

[54] METHOD OF SEISMIC ATTRIBUTE GENERATION AND SEISMIC EXPLORATION

[75] Inventors: Kurt Marfurt, Tulsa, Okla.; R. Lynn Kirlin, Victoria, Canada; Adam Gersztenkorn, Tulsa, Okla.

[73] Assignee: BP Amoco Corporation, Chicago, Ill.

[21] Appl. No.: 08/904,040

[22] Filed: Jul. 31, 1997

[51] Int. Cl.[6] .................................................. G06F 19/00
[52] U.S. Cl. ................................................. 702/16; 702/13
[58] Field of Search ................................. 702/16, 13, 12; 367/73

[56] References Cited

U.S. PATENT DOCUMENTS 5,563,949 10/1996 Bahorich .

OTHER PUBLICATIONS

Yilmaz, Seismic Data Processing, Chapter 6, pp. 384–427, Society of Exploration Geophysicists, 1987.
Allam & Moghaddamjoo, Spatial–Temporal DFT Projection for Wideband Array Processing, IEEE Signal Processing Letters, vol. 1, No. 2, Feb., 1994.
Dahlquist, Björck, & Anderson, Numerical Methods, Prentice Hall, 1974, Chapter 5.8.
Castagna, Avo Analysis: Tutorial & Review, appearing in Offset–Dependent–Reflectivity—Theory and Practice of AVO Analysis, Castagna and Backus (eds), SEG Press, 1993.
Brigham, The Fast Fourier Transform, Chapter 7, pp. 110–122, Prentice Hall, 1974.
Yilmaz, Seismic Data Processing, Chapter 1.6, pp. 62–79, Society of Exploration Geophysicists, 1987.
Marfurt, Schneider, & Mueller, Pitfalls of Using Conventional and Discrete Radon Transforms on Poorly Sampled Data, 61 Geophysics 1467–1482, 1996.
Huber, Robust Statistics, Wiley, 1981.
Bahorich & Farmer, The Coherence Cube, The Leading Edge, pp. 1053–1058, Oct. 1995.
Owsley, Sonar Array Processing, appearing in Array Signal Processing, Chapter 3, pp. 115–193, Haykin (eds), Prentice–Hall, 1985.

*Primary Examiner*—Donald E. McElheny, Jr.
*Attorney, Agent, or Firm*—James A. Gabala; Robert E. Sloat

[57] ABSTRACT

The present invention relates generally to the field of seismic exploration and, in more particular, to methods of quantifying and visualizing structural and stratigraphic features in three dimensions through the use of eigenvector and eigenvalue analyses of a similarity matrix. This invention also relates to the field of seismic attribute generation and the use of seismic attributes derived from similarity matrices to detect the conditions favorable for the origination, migration, accumulation, and presence of hydrocarbons in the subsurface. Additionally, the methods disclosed herein provide a new means for analyzing unstacked seismic data to uncover AVO effects. The invention disclosed herein will be most fully appreciated by those in the seismic interpretation and seismic processing arts.

74 Claims, 12 Drawing Sheets

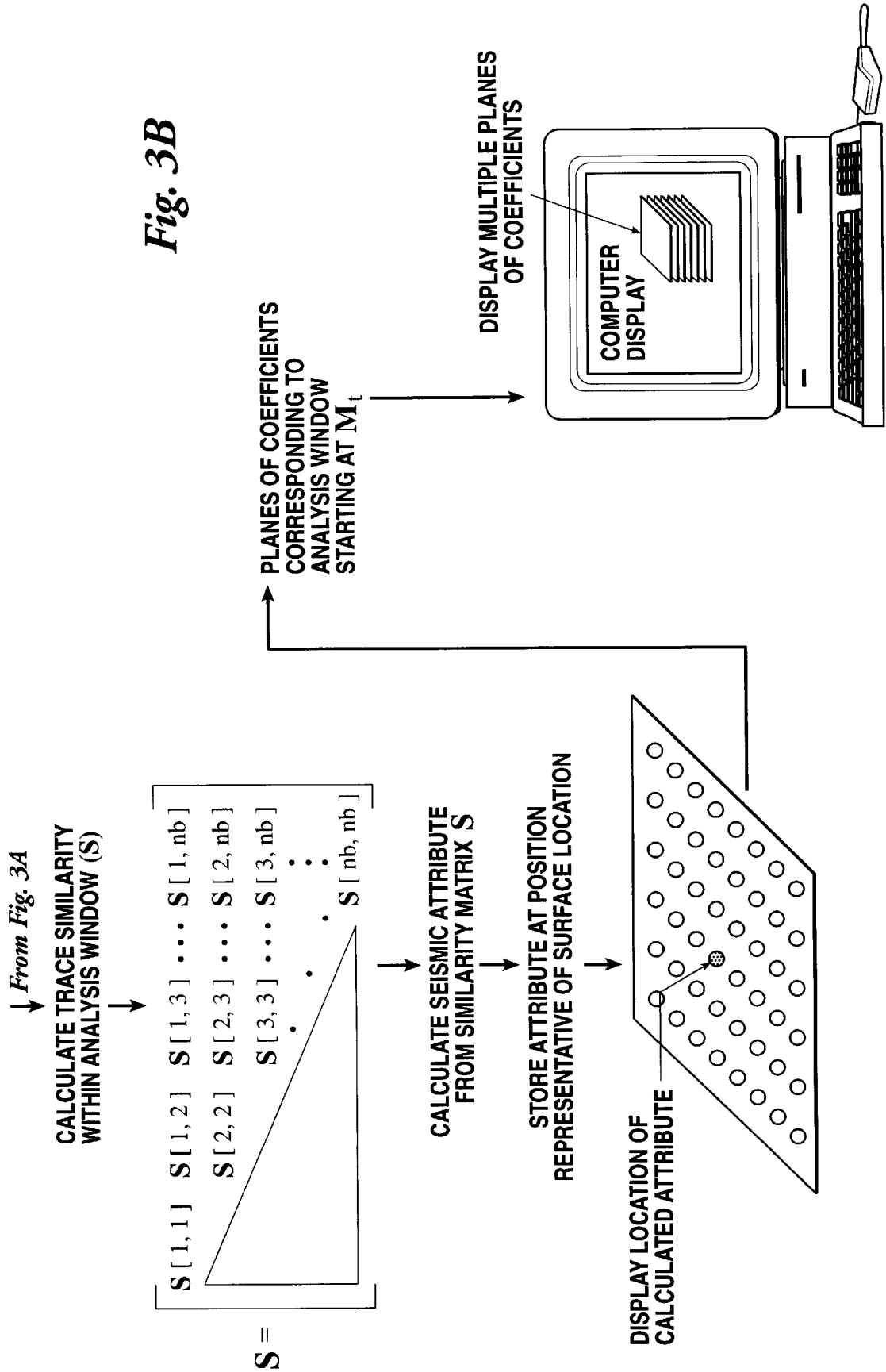

$$P_\eta[m, n(p,q)] = \begin{bmatrix} \begin{array}{c} p = -N_p \\ q = -N_q \\ \hline n(p,q) = 1 \end{array} & \begin{array}{c} p = -N_p+1 \\ q = -N_q \\ \hline n(p,q) = 2 \end{array} \\ e^0 & e^0 \\ e^{-i\omega\eta(-N_p \Delta p\, x_2 - N_q \Delta q\, y_2)} & e^{-i\omega\eta[(-N_p+1)\Delta p\, x_2 - N_q \Delta q\, y_2]} \\ e^{-i\omega\eta(-N_p \Delta p\, x_3 - N_q \Delta q\, y_3)} & e^{-i\omega\eta[(-N_p+1)\Delta p\, x_3 - N_q \Delta q\, y_3]} \\ \vdots & \vdots \\ e^{-i\omega\eta(-N_p \Delta p\, x_{np} - N_q \Delta q\, y_{np})} & e^{-i\omega\eta[(-N_p+1)\Delta p\, x_{np} - N_q \Delta q\, y_{np}]} \end{bmatrix}$$

$$\begin{matrix} p=-N_p+2 & & & & & p=+N_p \\ q=-N_q & & & & & q=+N_q \\ \overline{n(p,q)=3} & & & & & \overline{n(p,q)=(2N_p+1)(2N_q+1)} \end{matrix}$$

$$\begin{bmatrix} \vdots & & \vdots & & \\ e^0 & \cdots & e^0 & \cdots & \\ -i\omega\eta[(-N_p+2)\Delta p\, x_2 - N_q\Delta q\, y_2)] & & -i\omega\eta(+N_p\Delta p\, x_2 + N_q\Delta q\, y_2) & & \\ e & \cdots & e & \cdots & \\ -i\omega\eta[(-N_p+2)\Delta p\, x_3 - N_q\Delta q\, y_3)] & & -i\omega\eta(+N_p\Delta p\, x_3 + N_q\Delta q\, y_3) & & \\ e & & e & & \\ \vdots & & \vdots & & \\ -i\omega\eta[(-N_p+2)\Delta p\, x_{np} - N_q\Delta q\, y_{np}] & & -i\omega\eta(+N_p\Delta p\, x_{np} + N_q\Delta q\, y_{np}) & & \\ e & \cdots & e & \cdots & \end{bmatrix} = P_\eta[m,n(p,q)]$$

*---→ From Fig. 7A*

*---→ From Fig. 7A*

*Fig. 7B*

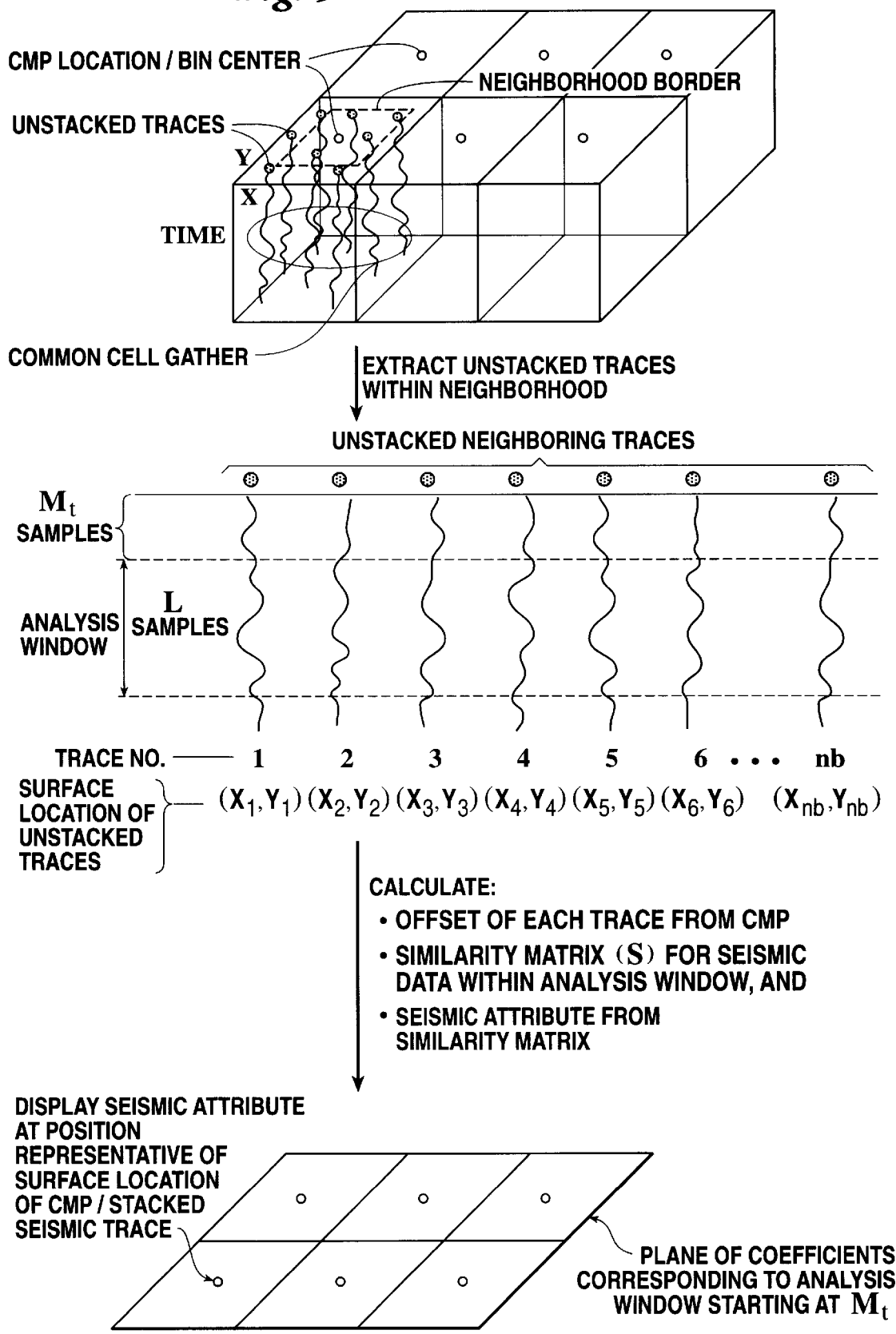

METHOD OF SEISMIC ATTRIBUTE GENERATION AND SEISMIC EXPLORATION

FIELD OF THE INVENTION

The present invention relates generally to the field of seismic exploration and, in more particular, to methods of quantifying and visualizing structural and stratigraphic features in three dimensions. This invention also relates to the field of seismic attribute generation and the use of seismic attributes to detect the presence of hydrocarbons in the subsurface. Additionally, it relates to the correlation of seismic attributes with subsurface features that are conducive to the migration, accumulation, and presence of hydrocarbons. The invention disclosed herein will be most fully appreciated by those in the seismic interpretation and seismic processing arts.

BACKGROUND

A seismic survey represents an attempt to map the subsurface of the earth by sending sound energy down into the ground and recording the "echoes" that return from the rock layers below. The source of the down-going sound energy might come from explosions or seismic vibrators on land, and air guns in marine environments. During a seismic survey, the energy source is moved across the surface of the earth above the geologic structure of interest. Each time the source is detonated, it generates a seismic signal that travels downward through the earth, is reflected, and, upon its return, is recorded at a great many locations on the surface. Multiple explosion/recording combinations are then combined to create a near continuous profile of the subsurface that can extend for many miles. In a two-dimensional (2-D) seismic survey, the recording locations are generally laid out along a single straight line, whereas in a three-dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area.

A seismic survey is composed of a very large number of individual seismic recordings or traces. In a typical 2-D survey, there will usually be several tens of thousands of traces, whereas in a 3-D survey the number of individual traces may run into the multiple millions of traces. A modem seismic trace is a digital recording (analog recordings were used in the past) of the acoustic energy reflecting back from inhomogeneities in the subsurface, a partial reflection occurring each time there is a change in the acoustic impedance of the subsurface materials. The digital samples are usually acquired at 0.004 second (4 millisecond or "ms") intervals, although 2 millisecond and 1 millisecond sampling intervals are also common. Thus, each digital sample in a seismic trace is associated with a travel time, and in the case of reflected energy, a two-way travel time from the surface to the reflector and back to the surface again. Further, the surface position of every trace in a seismic survey is carefully recorded and is generally made a part of the trace itself (as part of the trace header information). This allows the seismic information contained within the traces to be later correlated with specific subsurface locations, thereby providing a means for posting and contouring seismic data, and attributes extracted therefrom, on a map (i.e., "mapping"). General information pertaining to 3-D data acquisition and processing may be found in Chapter 6, pages 384–427, of *Seismic Data Processing* by Ozdogan Yilmaz, Society of Exploration Geophysicists, 1987, the disclosure of which is incorporated herein by reference.

The data in a 3-D survey are amenable to viewing in a number of different ways. First, horizontal "constant time slices" may be taken extracted from the seismic volume by collecting all digital samples that occur at the same travel time. This operation results in a 2-D plane of seismic data. By animating a series of 2-D planes it is possible to for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2-D seismic line from within the 3-D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface velocity are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets. In brief, seismic data provides some of the best subsurface structural and stratigraphic information that is available, short of drilling a well.

That being said, one of the most challenging tasks facing the seismic interpreter—one of the individuals within an oil company that is responsible for reviewing and analyzing the collected seismic data—is locating these stratigraphic and structural features of interest within a potentially enormous seismic volume. By way of example only, it is often important to know the location of all of the faults and/or other discontinuities in a seismic survey. Faults are particularly significant geological features in petroleum exploration for a number of reasons, but perhaps most importantly because they are often associated with the formation of subsurface traps in which petroleum might accumulate. Additionally, rock stratigraphic information may be revealed through the analysis of spatial variations in a seismic reflector's character because these variations may often be empirically correlated with changes in reservoir lithology or fluid content. Since the precise physical mechanism which gives rise to these variations may not be well understood, it is common practice for interpreters to calculate a variety of attributes from the recorded seismic data and then plot or map them, looking for an attribute that has some predictive value. Given the enormous amount of data collected in a 3-D volume, automated methods of enhancing the appearance of subsurface features related to the migration, accumulation, and presence of hydrocarbons are sorely needed.

Others have suggested methods for enhancing the appearance of subsurface geologic features, including discontinuities, in seismic data. For example, Bahorich et al., U.S. Pat. No. 5,563,949 suggests one such approach. Bahorich's discontinuity cube is obtained by the application of a coherency algorithm to the 3-D data in the time domain. In one embodiment the coherency algorithm combines the cross-correlations between adjacent traces. A maximum value for the cross-correlation must be chosen or "picked" from the (possibly multiple) relative maxima of the cross-correlation function, thereby introducing the possibility of a mispick where there is coherent noise. Additionally, that algorithm uses just three traces (two coherencies) at a time: one coherency calculated in the in-line direction and another calculated in the cross-line direction. Finally, that method can give poor results when the data to which it is applied are noisy.

Heretofore, as is well known in the seismic processing and seismic interpretation arts, there has been a need for a method of enhancing faults and other discontinuities in a 3-D seismic section which may be readily generalized to accommodate any number of neighboring traces. Additionally, the method should not require time domain picking of cross-correlation function maxima. Further, the method should also provide attributes for subsequent seismic stratigraphic and structural analysis. Accordingly, it should now be recognized, as was recognized by the present inventors, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

The present inventors have discovered a novel means of analyzing 2-D and 3-D seismic data to enhance the appearance of faults, fractures, dewatering features, karsting, levees and other discontinuities therein. Additionally, the present invention provides a new method of calculating trace-to-trace coherency which has advantages over the conventional cross-correlation-based approach. Finally, the instant invention is also directed toward uncovering seismic attributes that can be correlated with subsurface structural and stratigraphic features of interest, thereby providing quantitative values that can be mapped by the explorationist and used to predict conditions favorable for subsurface hydrocarbon or other mineral accumulations. As a preface to the disclosure that follows, note that the instant invention will be discussed in terms of its application to a 3-D seismic data set, although those skilled in the art understand that the same techniques disclosed herein could also be applied to advantage with 2-D seismic data and extended to lapsed time or so-called 4-D seismic data sets.

Broadly speaking, the instant invention consists of the following steps. First, a zone of interest within a 3-D data volume is specified and an initial analysis window within the zone of interest is selected. The analysis window will typically be somewhat smaller than the zone of interest and the inventors contemplate that a series of sliding analysis windows will be used to temporally "cover" the entire zone of interest. Since each analysis window ultimately gives rise to a 2-D "plane" of coefficients, by performing the steps that follow on a large number of windows a 3-D volume may be constructed by combining the resulting 2-D planes.

Next, the traces that intersect the zone of interest are identified and a (first) target trace is selected from among the identified traces. Using the location of the target trace as a center point, a neighborhood of pre-defined shape is inscribed about the target trace, and all of those traces that fall within this neighborhood are identified and extracted for further processing. Alternatively, a target location could be chosen (rather than a target "trace") and the neighborhood drawn about it. Next, an inter-trace similarity matrix (or "similarity matrix", hereinafter) is calculated which contains as elements some measure of the "covariance" (or similarity or correlation) between all of the extracted traces, including the target trace if there is one. This similarity matrix is then subjected to an eigenvalue/eigenvector analysis, wherein an eigenvector that corresponds to a particular matrix eigenvalue—typically the largest eigenvalue—is determined. It should be noted that the similarity matrix eigenvalues represent seismic attributes in their own right and may be individually displayed or manipulated further and then displayed to assist in the location of subsurface stratigraphic and structural features that may be conducive to the accumulation of hydrocarbons. By way of example, the largest eigenvalue of the similarity matrix is an excellent measure of the overall coherency exhibited by the traces encompassed by the neighborhood. However, the preferred embodiment of the present invention continues with an analysis of the elements of the eigenvector.

The elements of a matrix eigenvector may then be used to generate a variety of seismic attributes according to the methods described below. As a specific example of these methods, a "trend surface analysis" may be calculated from the elements in the eigenvector, wherein each element of the eigenvector (the "Z" coordinate) is associated with the surface location of its corresponding seismic trace (the "X" and "Y" coordinates), thereby forming a collection of as many (X,Y,Z) triplets as there are traces in the neighborhood. A trend surface function may then be fit to these triplets using conventional curve fitting techniques, which will produce a collection of coefficients that describes the mathematical equation that "best fits" the data triplets. Each coefficient that is returned from this trend surface analysis—and there may be several such coefficients—is a seismic attribute that is representative of the recorded data within this analysis window/neighborhood. Any attribute so calculated, may then be displayed at a location that is representative of the surface position of the target trace to provide information about the character of the subsurface thereunder.

The method then continues by selecting a next target trace and repeating the previous steps to produce another collection of trend surface coefficients and, thus, at least one additional seismic attribute. By continuing in this manner and successively analyzing a large number of target traces, a 2-D map of seismic attributes may be constructed, where each map is an accumulation of all resulting trend surface coefficients that are of the same "type." In fact, as many different 2-D maps may be produced as there are coefficients in the trend surface analysis, each of which maps will reflect a different aspect of the seismic data. Additionally, it is possible to create derived seismic attributes by combining trend surface coefficient values (e.g., by adding them, multiplying them together, etc.). Note, though, that those skilled in the art will recognize that a trend surface analysis is just one of many functional forms that might be used to fit the (X,Y, eigenvector value) triplets. In fact, any functional form might potentially be fit to these data triplets, provided that the function is characterized by one or more constant values which may be estimated from the data.

Finally, by repeating the above steps with a vertically shifted analysis window, another map will be produced which is parallel to the first, but representative of the seismic data contained in this different analysis window. Repeating the analysis for a variety of different vertically shifted analysis window locations will result in an ensemble of 2-D maps, which can then be posted vertically, one above the other, to form a 3-D volume of coefficients. The interpretation of this volume of coefficients depends on the precise seismic attribute displayed therein, and will be discussed in more detail hereinafter.

A second embodiment of the instant invention is substantially similar to that described above, but relies on an novel method of calculating the similarity matrix. In more particular, as before a zone of interest and analysis window are selected. Also as before, a first target trace is selected, the intention being that eventually each trace in the entire seismic volume will, in turn, become the target trace. Once again, the traces falling within some neighborhood of the target trace are identified and/or extracted.

Rather than directly computing a conventional similarity matrix, however, at this point the present embodiment continues by calculating a discrete Fourier transform at a particular "reference" frequency for the target trace and the other traces in its neighborhood. This will result in the production of one complex Fourier coefficient for each trace. The reference frequency might potentially be any frequency, but the instant inventors have found it advantageous to select it from within the typical seismic bandwidth: a reference frequency of 20 hertz often being utilized in practice for surface seismic data. By multiplying together the complex Fourier coefficient from one trace with the complex conjugate of the coefficient from another trace, a frequency domain representation of the similarity between the traces at the reference frequency is obtained. A similarity matrix at the reference frequency may thus be formed by taking all possible products between coefficients from the target trace and the neighborhood traces. This matrix will be denoted as a "single frequency" complex similarity matrix calculated at the reference frequency. Note that this matrix will generally contain complex values.

The instant inventors have discovered that it is possible to augment this single frequency matrix by adding to it additional single frequency matrices calculated at other frequencies, provided that the non-reference frequency matrices are "phase adjusted" before they are added to the reference frequency similarity matrix. By numerically summing the various phase adjusted single frequency matrices, a composite estimate of the similarity between the various traces is obtained. One way of calculating the phase adjustment is explained in Allam and Moghaddamjoo, *Spatial-Temporal DFT Projection for Wideband Array Processing*, IEEE Signal Processing Letters, vol. 1, No. 2, February, 1994, the disclosure of which is incorporated herein by reference. However, the preferred method of performing this calculation involves the use of a Radon transform and is described in some detail hereinafter.

Once the composite complex similarity matrix has been formed, the analysis of its values will proceed along the lines of the eigenvector/eigenvalue technique discussed above. However, since in this case the elements of the inter-trace similarity matrix are potentially complex valued, the eigenvector may also potentially have complex values. This means that it will be possible to perform separate analyses using the amplitude and phase portions of the eigenvector elements. Additionally, the complex eigenvector value elements themselves may be directly used. Further, each analysis—amplitude, phase, or complex, as well as functional combinations thereof—will produce unique seismic attributes which, in turn, may be correlated with subsurface features conducive to the migration, accumulation, and presence of hydrocarbons.

Finally, the instant inventors have discovered that these same techniques may be applied to unstacked seismic gathers (either 2-D or 3-D) to provide a novel method of analyzing amplitude variations with offset in unstacked seismic traces (AVO, hereinafter). An unstacked gather in a 3-D survey is analyzed by the methods discussed above to produce a single seismic attribute that is displayed at a position representative of the surface location of the corresponding stacked seismic trace. The neighborhood traces are drawn from the unstacked traces in a common mid-point gather (2-D data) or a common cell gather (3-D). As before, by repeating the analysis on a number of different gathers, a plane of seismic attributes is thereby formed. Similarly, a volume of seismic attributes that are representative of AVO effects may be obtained by repeating the analysis for several different analysis windows.

Although the embodiments disclosed above have been presented in terms of seismic traces having "time" as a vertical axis, it is well known to those skilled in the art that seismic traces with vertical axes which are not in units of time (e.g., traces that have been depth migrated to change the vertical axis to depth) would function equally well with respect to the methods disclosed herein. Similarly, those skilled in the art will recognize that the techniques disclosed herein could also be applied to advantage to the search for other, non-hydrocarbon, subsurface resources.

BRIEF DESCRIPTION OF THE DRAWINGS

FIGS. 3A–3B displays the broad scheme utilized by the instant invention to produce a cube of seismic attributes.

FIGS. 7A–7B illustrates how the Radon transform matrix is constructed.

FIG. 9 displays an application of the instant invention to unstacked 3-D seismic data.

DETAILED DESCRIPTION OF THE PREFERRED EMBODIMENTS

The present invention provides a method of processing seismic data, whereby its utility as a detector of faults and other discontinuities in 2-D or 3-D seismic data is enhanced. More generally, the method disclosed herein is directed toward uncovering seismic attributes that can be correlated with subsurface structural and stratigraphic features of interest, thereby providing quantitative values that can be mapped by the explorationist and used to predict subsurface hydrocarbon or other mineral accumulations. Finally, a new method of determining trace-to-trace similarity is provided which has advantages over the conventional cross-correlation-based approach and which provides enhanced utility to the methods disclosed herein.

Figure 1:
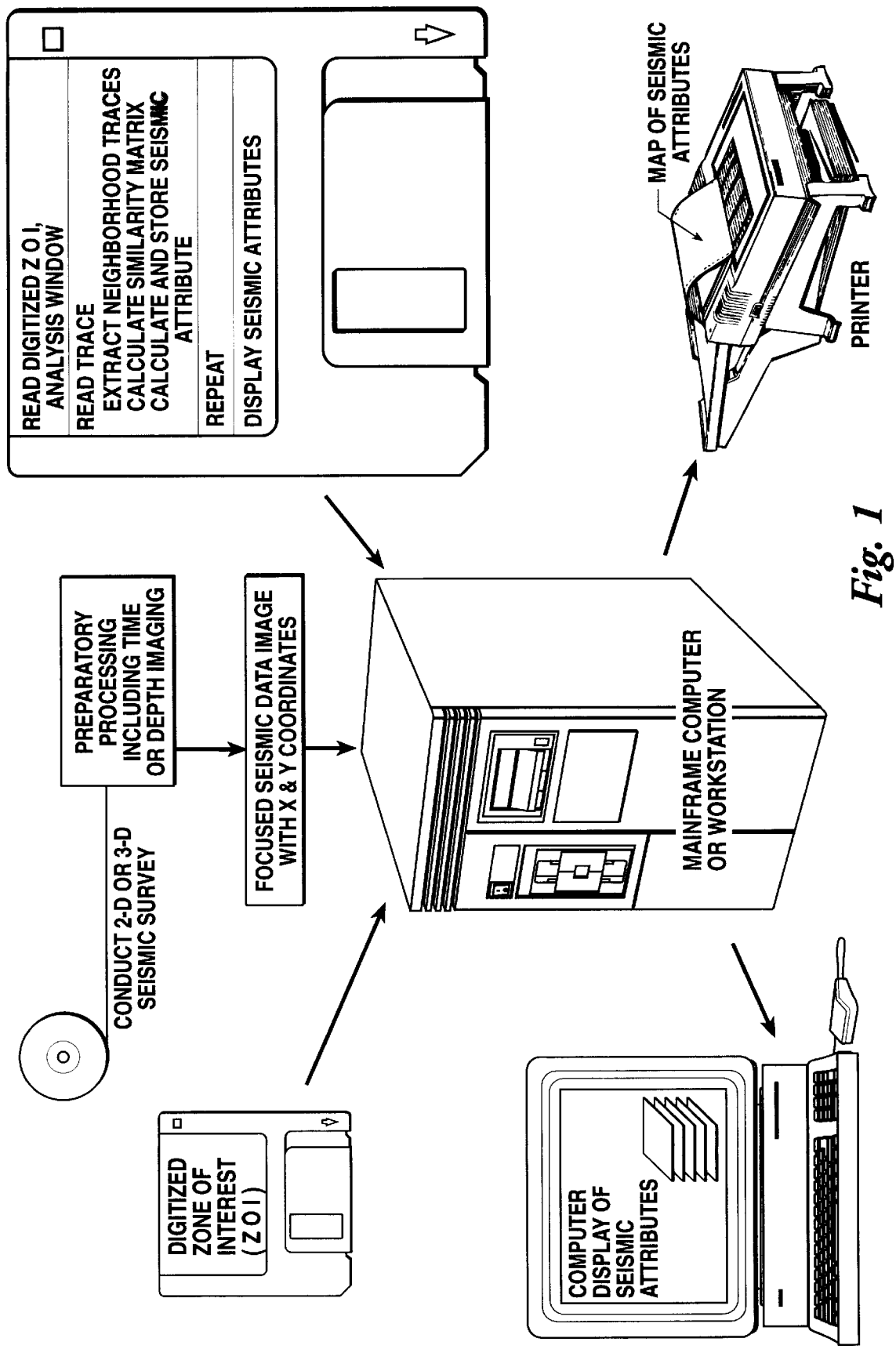
FIG. 1 illustrates generally the environment in which the invention disclosed herein would be used.

FIG. 1 illustrates the general environment in which the instant invention would typically be used. Seismic data (either 2-D or 3-D) are collected in the field over some target of economic importance and are then brought back into the processing center. There, a variety of preparatory processes are applied to the seismic traces to make them ready for use in the methods disclosed hereinafter, said processes typically including the association of an X and Y surface coordinate with every processed trace. The processed traces and would then be made available for use in the instant invention and might be stored, by way of example only, on hard disk, magnetic tape, magneto-optical disk or other mass storage means.

The methods disclosed herein would be implemented in the form of a compiled or interpreted computer program loaded onto a general purpose programmable computer where it is accessible by a seismic interpreter or processor. The zone of interest will typically be specified by the interpreter and provided to the programs in digitized form. As illustrated in FIG. 1, the zone of interest definition is read by the program and used to delimit those portions of the seismic traces which will be analyzed by the instant methods. In some cases, a specific zone of interest will not be explicitly specified, but rather the entire seismic volume will be selected for analysis—the zone of interest then being the entire seismic volume.

As is further illustrated in FIG. 1, the program might be conveyed into the computer by way of floppy disk or, for example, by magnetic disk, magnetic tape, magneto-optical disk, optical disk, CD-ROM or loaded over a network. After the process has been applied to seismic data, the results would typically be displayed either at a high resolution color computer monitor or in hardcopy form as a map. The seismic interpreter would then use the displayed images to assist him or her in identifying subsurface features of interest.

PREPARATORY PROCESSING

Figure 2:
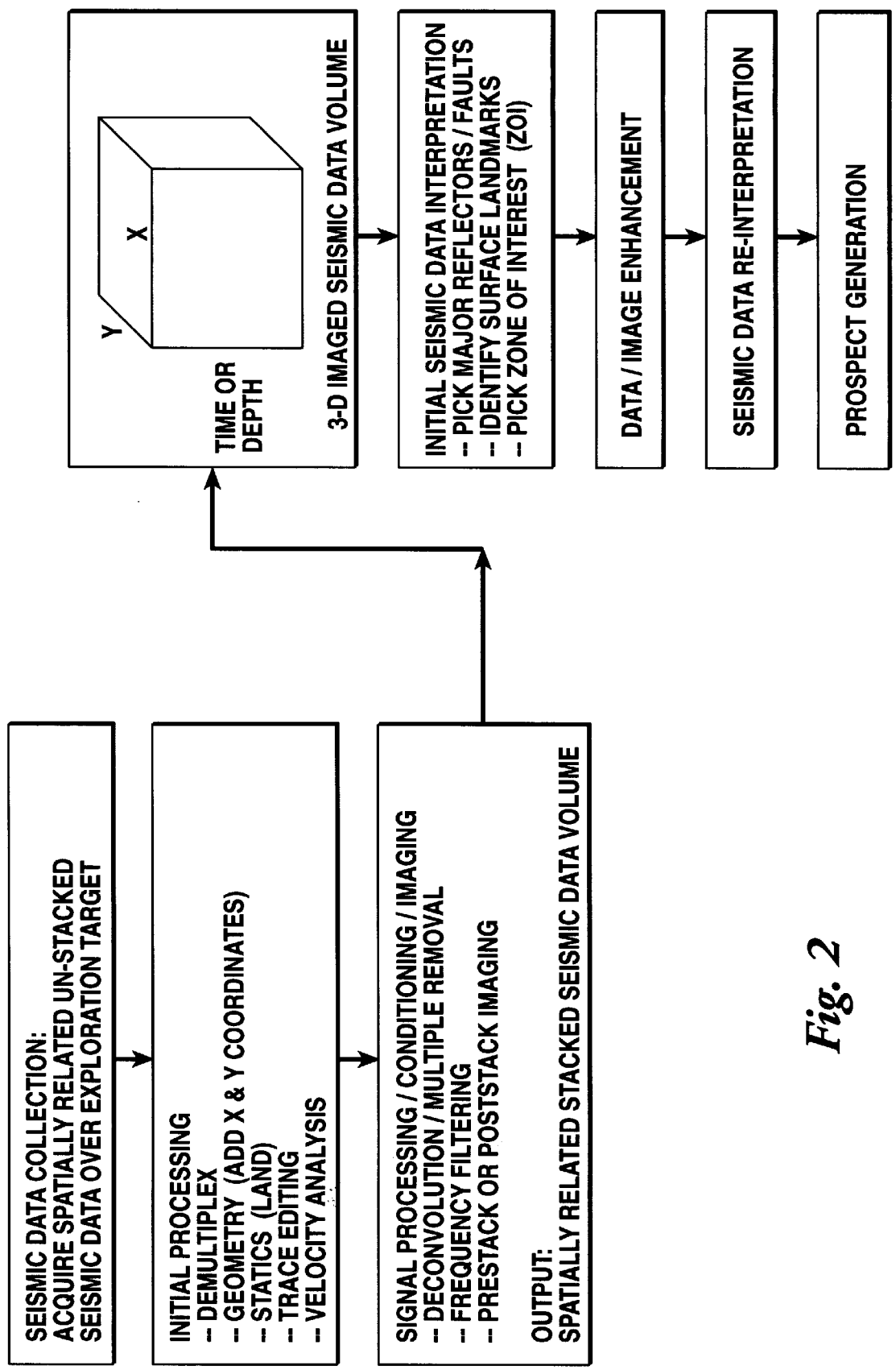
FIG. 2 is a schematic diagram that illustrates how the instant invention might be utilized within a conventional exploration seismic processing stream.

As a first step, and as is generally illustrated in FIG. 2, a seismic survey is conducted over a particular portion of the earth. In the preferred embodiment, the survey will be 3-D, however a 2-D survey would also be appropriate. The data that are collected consist of unstacked (i.e., unsummed) seismic traces which contain digital information representative of the volume of the earth lying beneath the survey. Methods by which such data are obtained and processed into a form suitable for use by seismic processors and interpreters are well known to those skilled in the art. Additionally, those skilled in the art will recognize that the processing steps illustrated in FIG. 2 are only broadly representative of the sorts of steps that seismic data would normally go through before it is interpreted: the choice and order of the processing steps, and the particular algorithms involved, may vary markedly depending on the particular seismic processor, the signal source (dynamite, vibrator, etc.), the survey location (land, sea, etc.) of the data, and the company that processes the data.

The goal of a seismic survey is to acquire a collection of spatially related seismic traces over a subsurface target of some potential economic importance. Data that are suitable for analysis by the methods disclosed herein might consist of, for purposes of illustration only, one or more shot records, a constant offset gather, a CMP gather, a VSP survey, a 2-D stacked seismic line, a 2-D stacked seismic line extracted from a 3-D seismic survey or, preferably, a 3-D portion of a 3-D seismic survey. Additionally, migrated versions (either in depth or time) of any of the data listed above are preferred to their unmigrated counterparts. Ultimately, though, any 3-D volume of digital data might potentially be processed to advantage by the methods disclosed herein. However, the invention disclosed herein is most effective when applied to a group of seismic traces that have an underlying spatial relationship with respect to some subsurface geological feature. Again for purposes of illustration only, the discussion that follows will be couched in terms of traces contained within a stacked and migrated 3-D survey, although any assembled group of spatially related seismic traces could conceivably be used.

After the seismic data are acquired, they are typically brought back to the processing center where some initial or preparatory processing steps are applied to them. As is illustrated in FIG. 2, a common early step is the specification of the geometry of the survey. As part of this step, each seismic trace is associated with both the physical receiver (or array) on the surface of the earth that recorded that particular trace and the "shot" (or generated seismic signal) that was recorded. The positional information pertaining to both the shot surface position and receiver surface position are then made a permanent part of the seismic trace "header," a general purpose storage area that accompanies each seismic trace. This shot-receiver location information is later used to determine the position of the "stacked" seismic traces.

After the initial pre-stack processing is completed, it is customary to condition the seismic signal on the unstacked seismic traces before creating a stacked (or summed) data volume. In FIG. 2, the "Signal Processing/Conditioning/Imaging" step suggest a typical processing sequence, although those skilled in the art will recognize that many alternative processes could be used in place of the ones listed in the figure. In any case, the ultimate goal is the production of a stacked seismic volume or, of course, a stacked seismic line in the case of 2-D data. The stacked data will preferably have been migrated (in either time or depth) before application of the instant invention (migration being an "imaging" process).

As is suggested in FIG. 2, any digital sample within the stacked seismic volume is uniquely identified by an (X,Y, TIME) triplet: the X and Y coordinates representing some position on the surface of the earth, and the time coordinate measuring a distance down the seismic trace. For purposes of specificity, it will be assumed that the X direction corresponds to the "in-line" direction, and the Y measurement corresponds to the "cross-line" direction, as the terms "in-line" and "cross-line" are generally understood to mean in the art. Although time is the preferred and most common vertical axis unit, those skilled in the art understand that other units are certainly possible might include, for example, depth or frequency. That being said, the discussion that follows will be framed exclusively in terms of "time" as a vertical axis measure, but that choice was made for purposes of specificity, rather than out of any intention to so limit the methods disclosed herein.

As a next step, the explorationist may do an initial interpretation on the resulting volume, wherein he or she locates and identifies the principal reflectors and faults wherever they occur in the data set. Note, though, that in some cases the interpreter may choose instead to use the instant invention to assist him or her in this initial interpretation. Thus, the point within the generalized processing scheme illustrated in FIG. 2 at which the instant invention might be applied may differ from that suggested in the figure, depending on any number of factors.

SEISMIC ATTRIBUTE GENERATION

Figure 6A:
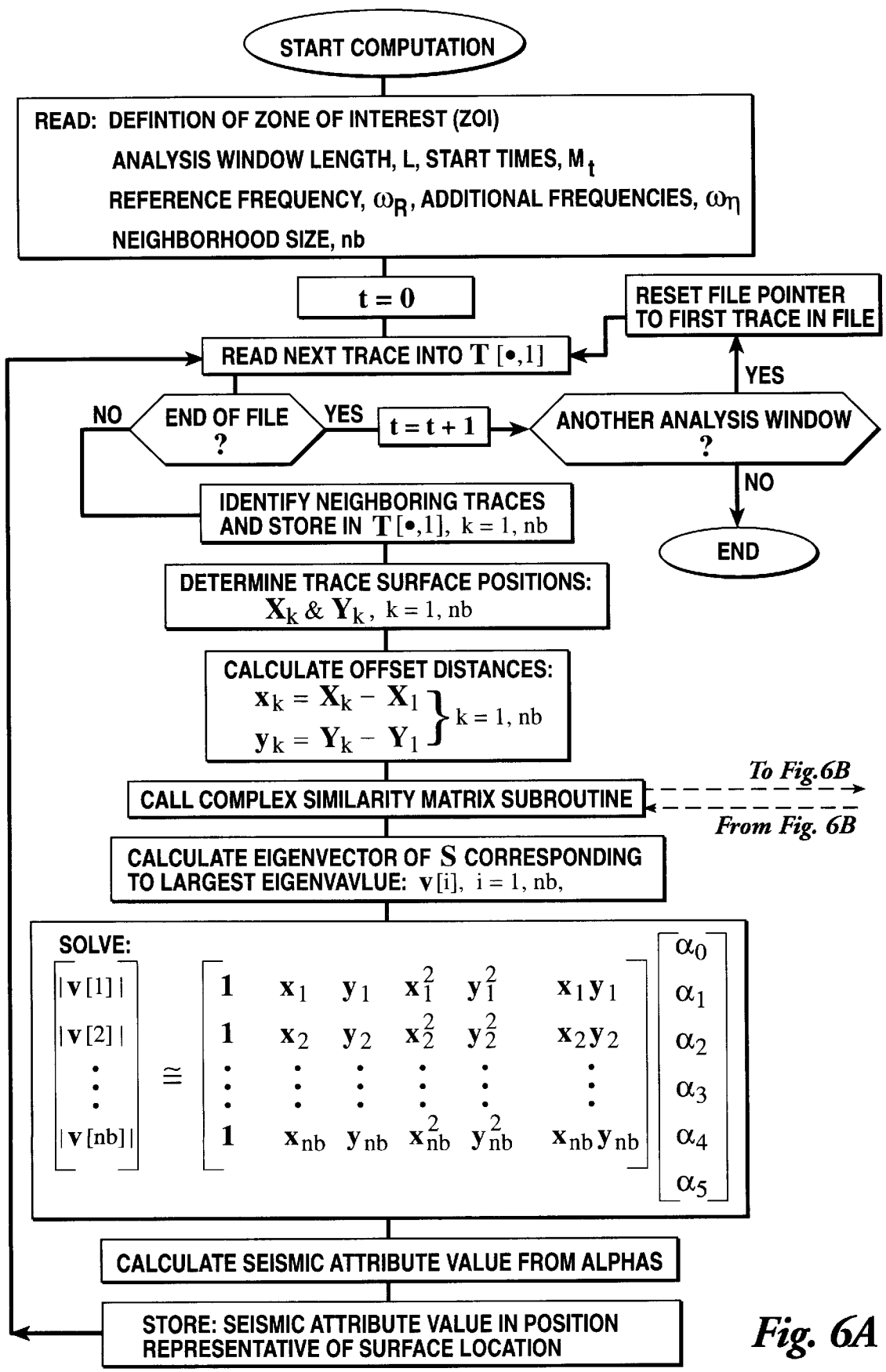
FIGS. 6A–6B is a flow chart that illustrates a presently preferred embodiment.
Figure 6B:
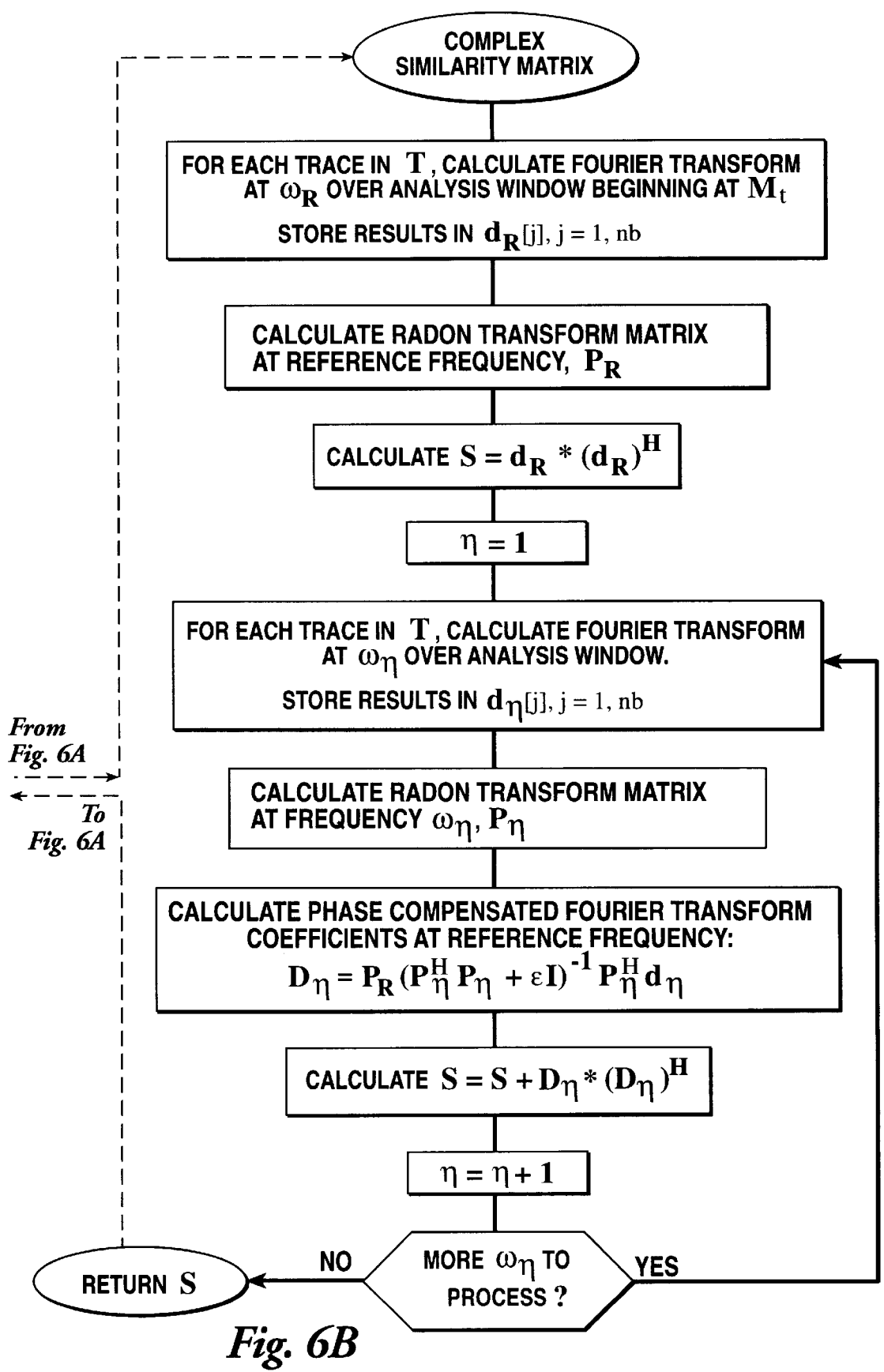
Figure 8B:
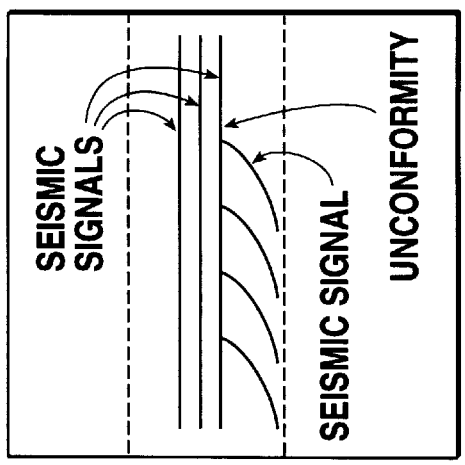
FIGS. 8A–8D illustrates some different seismic reflector configurations that are amenable to analysis by the methods disclosed herein.
Figure 8D:
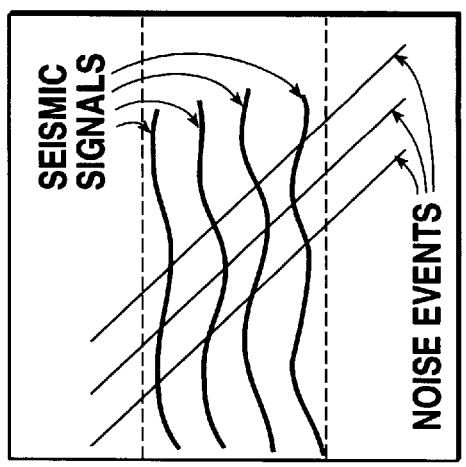
Figure 8A:
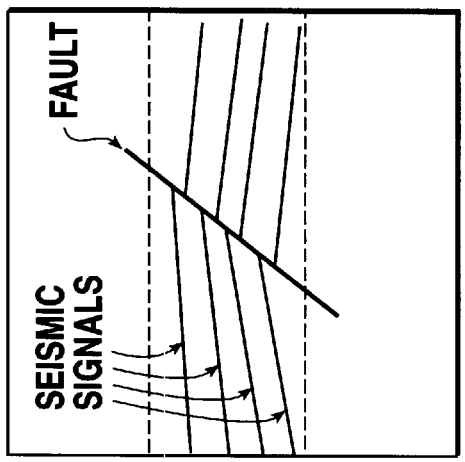
Figure 8C:
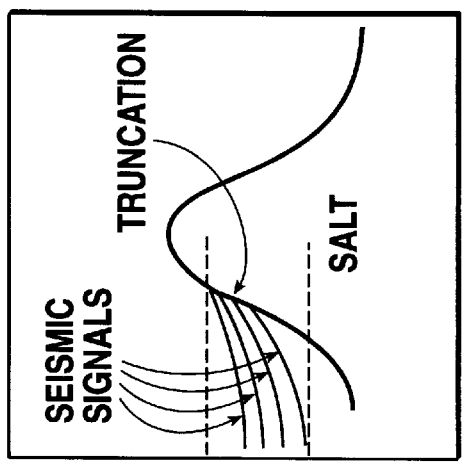

The invention disclosed herein would most often be applied at the processing stage suggested by the "Data/Image Enhancement" entry in FIG. 2, the general object of the instant invention being to use the seismic data volume to produce a "seismic attribute cube" which can then be utilized by the interpreter in his or her quest for exploration targets. The cube might contain, by way of example only, seismic attributes that highlight discontinuities in the seismic data. It might also contain attributes that are correlated with seismic hydrocarbon indicators, the precise utility of the resulting cube being a function of the choice of estimation function discussed hereinafter. FIG. 6A contains a program flow chart that illustrates the principal steps of an embodiment of the instant invention, wherein a complex similarity matrix (FIG. 6B and discussed hereinafter) is computed and utilized. Note though, that if a conventional similarity matrix subroutine is substituted for the complex similarity matrix subroutine of FIG. 6B, then FIG. 6A represents the basic steps of the method taught in this instant embodiment.

As a first step, the interpreter or processor will be expected to select a zone of interest within the seismic volume. The zone of interest broadly defines the time limits over which the instant invention will be applied. This zone might consist, by way of example only, of fixed time limits which define a sub-cube of the seismic volume (e.g., from 2000 ms to 3000 ms) or the zone of interest might be "hung" from some reflector of interest and encompass the, e.g., 500 ms of seismic data that lie immediately below the reflector. In some instances, the entire seismic volume might designed as the "zone of interest. In other cases, the zone of interest might consist of 80 ms of data or even less. However, for purposes of illustration in the text that follows, the zone of interest will be assumed to be the sample range extending from the first sample to the Nth sample or from 0 ms to $(N-1)*\Delta t$ seconds in time, $\Delta t$ being used to represent the seismic trace sample rate measured in seconds.

Figure 3A:
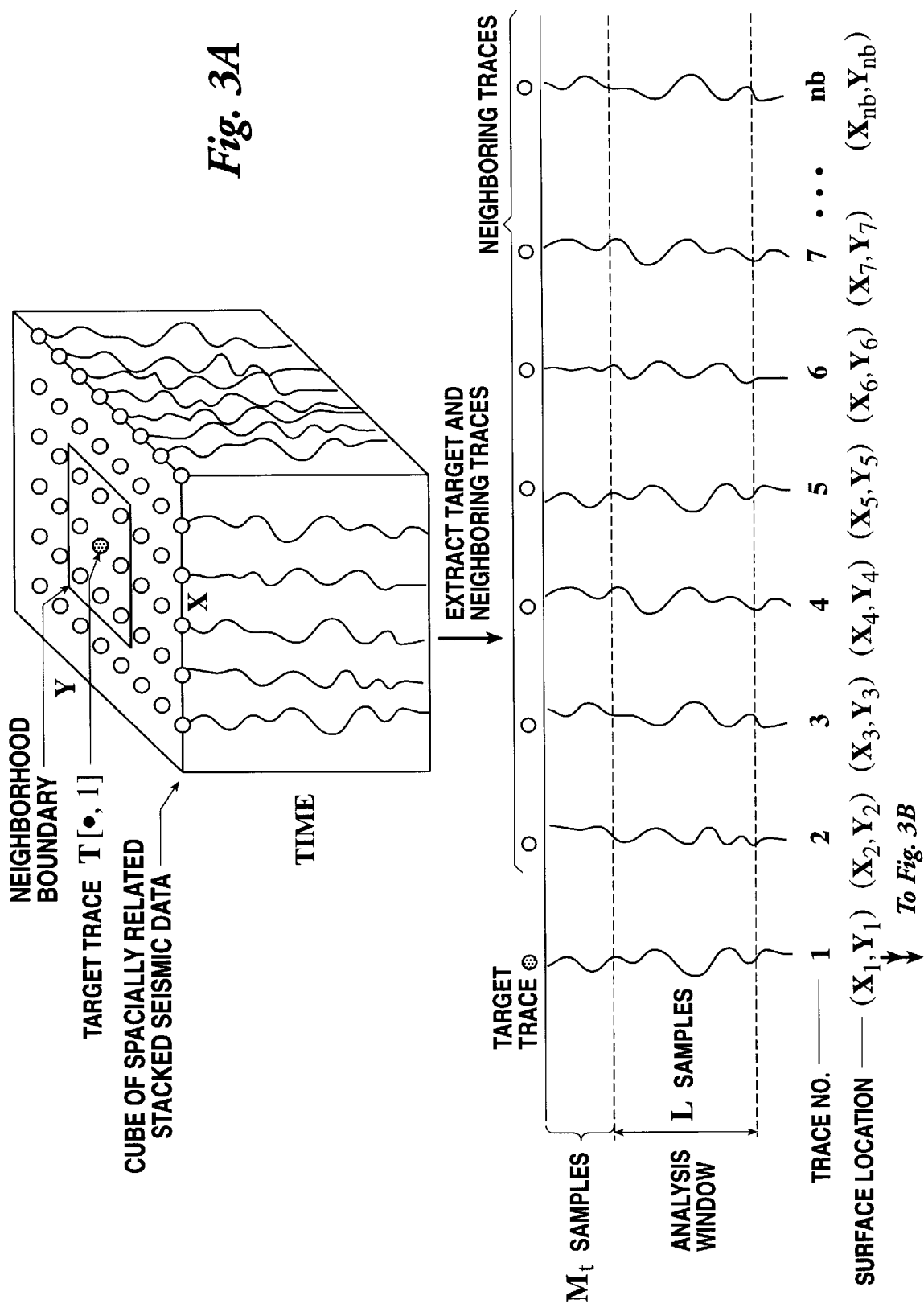

As illustrated in FIG. 3A, let the variable "L" be used to represent the length in digital samples of a temporal analysis window in the data. The length of the analysis window is preferably chosen to be short enough to accommodate a single reflector, but other lengths are certainly possible and have been contemplated by the inventors, including an analysis window length that encompasses the entire zone of interest. A typical value of L might be 21 samples (or 80 ms at a 4 ms sample rate), thereby providing a theoretical frequency analysis range from 0 Hertz to 125 Hertz. Let the analysis window start time in samples be designated by the variable $M_t$. As is explained more fully below and as is illustrated broadly in FIG. 4, in the preferred embodiment of the present invention a series of temporally-shifted analysis windows will be applied to every trace that intersects the zone of interest, a 2-D plane of seismic attributes being generated at each analysis window placement. This arrangement is commonly known as a "sliding analysis window" by those skilled in the art. Of course, if the starting and ending times of the analysis window coincide with those of the zone of interest, only a single window position would be utilized.

Now, the seismic volume will be read and processed as follows. First, as is illustrated in FIG. 3A, a neighborhood is established about the currently active or "target" trace. Alternatively, a target "location" could be specified and the analysis would continue as indicated hereinafter, but without a specific target trace. The purpose of the neighborhood is to select from among the traces within the seismic volume, those traces that are "close" in some sense to the target. All of the traces that are closer to the target location than the outer perimeter of the neighborhood are selected for the next processing step. This neighborhood region might be defined by a shape that is rectangular, as is illustrated in FIG. 3A, or circular, elliptical or many other shapes. Let the variable "nb" be the number of traces—including the target trace if there is one—that have been included within the neighborhood. The inventors have found that using 25 traces, the target trace being the center of a five by five trace rectangular neighborhood, produces satisfactory results in most cases. It should be clear to those skilled in the art, however, that the methods herein might potentially be applied to any number of neighborhood traces.

As a next step, and as is also illustrated in FIG. 3A, the traces within the neighborhood are identified and extracted. Although the discussion that follows assumes that an actual extraction has been performed, those skilled in the art will recognize that the traces need not be physically moved, but rather computational efficient implementations of the invention disclosed herein are possible which do not require a physical relocation of the seismic values, e.g. by marking these traces and reading them from disk as needed. For purposes of specificity, let the array T[i,j], i=1,N, j=1, nb be a temporary storage array into which the target trace and all neighboring traces have been placed. Further, let the column vector T[•,1], represent the target trace, the symbol "•" being used to indicate that the matrix index replaced thereby is taken to vary over its complete range, 1 to N in this case. Finally, let the variables $x_j$ and $y_j$, j=1, nb, represent the offset position of each trace from the target location. By way of explanation, every seismic trace in a survey has an associated X and Y surface coordinate in some Cartesian coordinate system. Of course, those skilled in the art know that even if the location of each trace is maintained in some non-cartesian system, for example, in latitude and longitude, that system may easily be converted to a Cartesian system through basic cartographic map projection techniques. Thus, if $X_0$ and $Y_0$ represent the coordinates of the surface position of the target trace/target location and $X_j$ and $Y_j$ the position of the "jth" trace in T, then the offset distances are calculated as follows:

$$x_j = X_j - X_0, j=1, nb$$

$$y_j = Y_j - Y_0, j=1, nb$$

Thus, $x_1 = y_1 = 0$, because the target trace—and its associated X and Y coordinates—is stored in the first array location. If there is no target trace, $x_1$ and $y_1$ will represent the offset distances from the first trace to the target location and will not necessarily be equal to zero.

Next, a similarity matrix is calculated, each element of which represents some measure of the similarity or coherency between the traces T[i,j]. Let S[k,n], k=1, nb, n=1,nb, represent the similarity matrix, and let S represent the entire matrix. Thus, the element S[m,p] represents some measure of the similarity between traces T[•,m] and T[•,p]. S[1,m] in particular represents the similarity between the target trace and the neighborhood trace T[•,m], provided that a target trace has been specified. The diagonal elements of S, S[m, m], measure the "self-similarity" of the neighborhood traces, i.e., the calculated similarity between each trace and itself. These values are obtained by applying the selected similarity algorithm to the "two" traces T[•,m] and T[•,m].

The matrix S is a symmetric matrix, or a Hermitian matrix if its elements are complex values, a complex value being a quantity expressed in the form "a+bi", where "i" represents the imaginary number, $\sqrt{-1}$. A symmetric matrix is one wherein its values above and below the diagonal are equal:

$$S[i,j]=S[j,i],$$

whereas the above-diagonal elements in a Hermitian matrix are complex conjugate pairs of the below-diagonal elements:

$$S[i,j]=S[j,i]^*$$

where the asterisk has been used to denote complex conjugation. In FIG. 3B, the triangular shape which replaces the lower left corner of the elements in S indicates that the matrix elements replaced thereby are equal to those displayed (or their complex conjugates), i.e., that the matrix is symmetric (or Hermitian).

The inter-trace similarity measure might be calculated any number of ways and, indeed, a preferred method of estimating this value is discussed at some length below. But, as an example of how some conventional measures of similarity might be used in the instant invention, consider initially the zero-mean/zero-lag cross-correlation as a measure of similarity:

$$S[i,j] = \sum_{k=M_t}^{M_t+L-1} T[k,i]T[k,j],$$

or its normalized variant:

$$S[i,j] = \frac{\sum_{k=M_t}^{M_t+L-1} T[k,i]T[k,j]}{\sqrt{\sum_{k=M_t}^{M_t+L-1} T[k,i]^2} \sqrt{\sum_{k=M_t}^{M_t+L-1} T[k,j]^2}}$$

Alternatively, S[i,j] could be the maximum value of the lagged cross-correlation, a measure that is often used in, for example, statics computations:

$$S[i,j] = \text{Max}_n \left\{ \sum_{k=M_t}^{M_t+L-1} T[k,i]T[k+n,j] \right\}$$

where "n" is some number of lags of shift (either positive or negative). As a final example, a statistical measure of association (e.g., the correlation coefficient) might also be used:

$$S[i,j] = \frac{\sum_{k=M_t}^{M_t+L-1} (T[k,i]-\overline{T[i]})(T[k,j]-\overline{T[j]})}{\sqrt{\sum_{k=M_t}^{M_t+L-1} (T[k,i]-\overline{T[i]})^2} \sqrt{\sum_{k=M_t}^{M_t+L-1} T([k,j]-\overline{T[j]})^2}},$$

where $\overline{T[j]}$ and $\overline{T[i]}$ represent the mean, or average value, of T[i] and T[j] respectively within the analysis window $k=M_t$ to $k=M_t+L-1$. Alternatively, an unnormalized version of the same expression could be used, wherein only the calculation indicated in the numerator would be performed.

Whatever the choice of a measure of similarity or distance metric, the steps that follow operate on the matrix S to produce a seismic attribute that will be displayed at a location representative of the surface position of the target trace or target location. Broadly speaking, a seismic attribute is any measure of the seismic trace data that reduces its dimensionality and makes the seismic data easier to display and interpret. Scalar seismic attributes are generally preferred because they are more amenable to posting and mapping. For example, the peak value of a seismic reflector is a single value that provides information in a condensed form about an entire waveform, the length of which may be 25 or more digital samples. Similarly, the largest eigenvalue of S is another such seismic attribute, and one that the inventors hereto have utilized in a preferred embodiment of the instant invention. Other attributes may be calculated from the matrix elements of S (e.g., the rank of S or its determinant) and its eigenvectors. However, the text that follows will focus the use of the eigenvalues and eigenvectors of S to obtain seismic attributes which can thereafter be mapped and used to locate subsurface features of geological and economic interest.

In terms of equations, it is well known to those skilled in the art that an eigenvalue, $\lambda$, of a matrix S is any solution of the following matrix equation:

$$\lambda v = Sv,$$

where the eigenvector, v, is a nb by 1 vector, and $\lambda$ is a constant. The previous equation may be numerically solved by any number of methods, but the instant inventors have found it preferable to use the Rayleigh quotient method as described in, for example, *Numerical Methods*, by Dahlquist, Bjorck, and Anderson, Prentice Hall, 1974, Chapter 5.8.1, the disclosure of which is incorporated by reference. A square matrix has as many eigenvalues as it has rows (columns)—nb in this case. Additionally, if a matrix contains only real values and is symmetric, all of its eigenvalues are real. Similarly, if a matrix contains complex values and is Hermitian, all of its eigenvalues are real valued, even though the matrix contains complex values. Let $\lambda_1$ be the largest of the nb eigenvalues of S and $\lambda_k$, k=2, nb, be the remaining eigenvalues of the matrix. For purposes of specificity, let the eigenvalues be numerically ordered in terms of size, that is:

$$\lambda_1 \geq \lambda_2 \geq \ldots \geq \lambda_{nb}.$$

Given the eigenvalues of the similarity matrix, a number of seismic attributes may be calculated therefrom. As a broad rule, any arbitrary function of one or more eigenvalues (i.e., $G(\lambda_1, \lambda_2, \ldots \lambda_k)$) is potentially a seismic attribute that might be associated with a subsurface feature of interest. One example of such a function is $$G(\lambda_1, \lambda_2, \ldots, \lambda_{np}) = c = \frac{\lambda_1}{\sum_{i=1}^{np} \lambda_i} = \frac{\lambda_1}{Tr(S)},$$

where Tr(S) symbolizes the numerical trace of a matrix and is equal to the sum of the diagonal elements of S, it being well known to those skilled in the art to that the numerical trace of a matrix is equal to the sum of its eigenvalues. This seismic attribute is a composite measure of the coherency between the traces within the neighborhood and the quantity "c" ranges in value between 0 and 1. By way of explanation, in the event that the target and neighborhood traces are all identical within the analysis window, those skilled in the art know that the elements of the matrix S would then all take the same value:

$$S[1,1]=S[1,2]=S[1,3]= \ldots =S[nb, nb];$$

that the matrix S would be of rank 1; and that the quantity c would therefore reduce to $\lambda_1/\lambda_1$. To the extent that the digital samples within the analysis window are different from trace to trace, the value of c will decrease from its maximum value of unity toward 1/nb, the lower value tending to indicate that all of the energy within the analysis window is incoherent. Thus, c provides a general measure of the similarity of the traces as they appear within the analysis window.

By repeating the above eigenvalue computation for a number of different target seismic traces (or target surface locations) using the same analysis window, a 2-D plane of c coefficients may be accumulated. Eventually, in the preferred embodiment each trace in the volume will, in turn, become the target trace and will thereby contribute a single attribute value to the 2-D plane. Finally, each calculated seismic attribute is preferably displayed within the 2-D plane at a position that is representative of the surface position of the target trace/target location which gave rise to it, thereby allowing the seismic interpreter to correlate these attributes with subsurface features. (This concept is illustrated generally in FIGS. 3A and 3B.)

Figure 4:
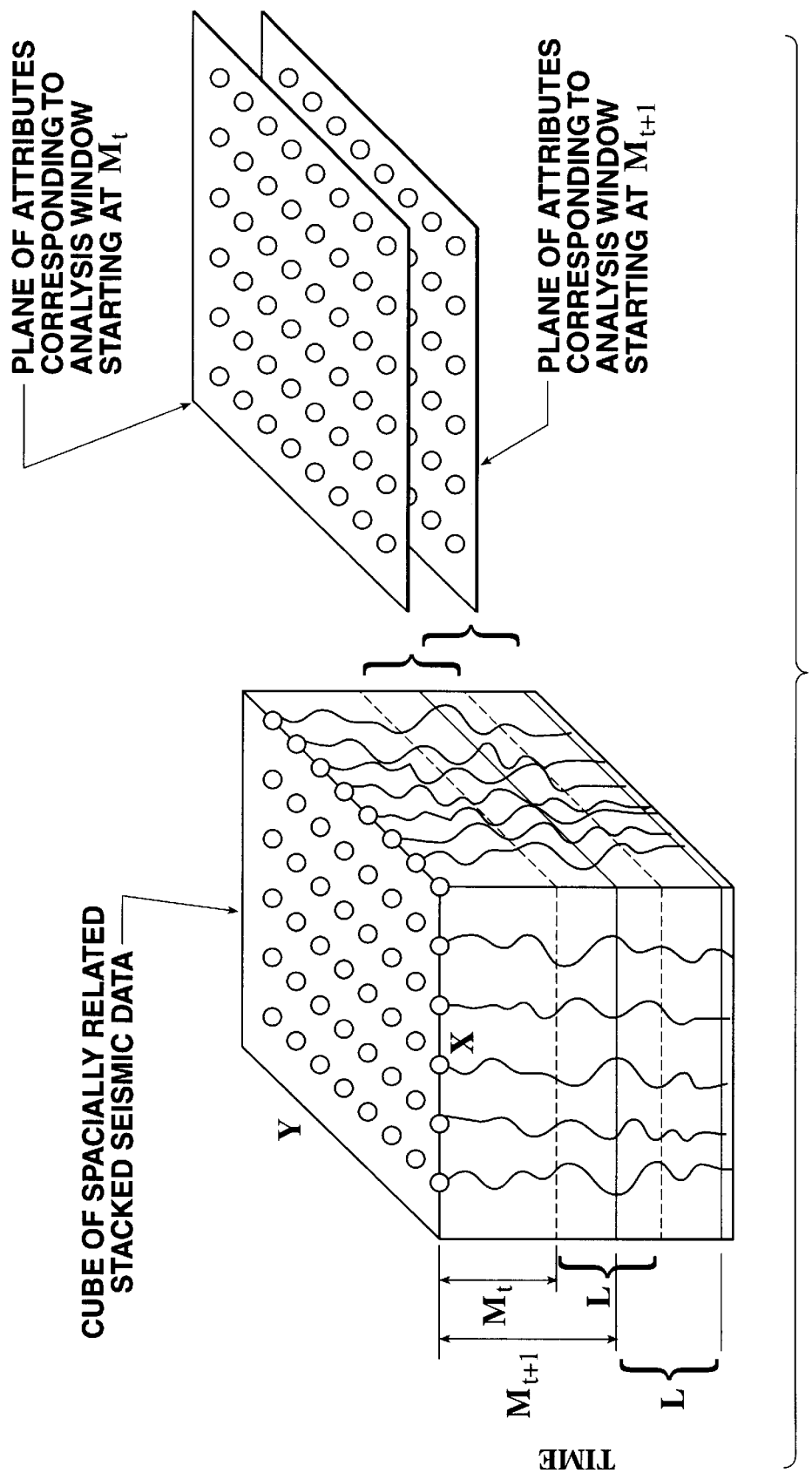
FIG. 4 contains a schematic illustration of how multiple attribute planes corresponding to different analysis windows may be obtained from a single seismic data volume.

If, as the instant inventors prefer, the analysis window is now moved in time and the process described above repeated, another plane of coefficients will be generated. Preferably, the analysis window is moved sequentially in a series of fixed increment steps in time, each analysis window choice giving rise to another 2-D plane of attributes. As illustrated in FIG. 4, if the temporal increment is smaller than the width of the analysis window L, a series of overlapping windows will result. A typical window length/ increment combination for 4 ms data might be an analysis window of 80 ms and an increment of Δt=4 ms, resulting in successive windows that largely overlap. Thus, in terms of the sample index introduced previously:

$$M_t = M_{t-1} + 1$$

corresponding to times, τ ($\tau_t = M_t * \Delta t$)

$$\tau_t = \tau_{t-1} + \Delta t$$

in a typical case. A cube of these "c" coefficients will tend to highlight discontinuities in the data and will thereby assist the interpreter in locating faults, channels, and other structural, stratigraphic, or diagenic discontinuities within the 3-D seismic volume.

Other functions of the eigenvalues of the similarity matrix have also been found by the instant inventors to have some diagnostic properties as seismic attributes. For example, when the seismic data within the analysis window are completely random and incoherent (i.e., where there is no "similarity" between the traces), each of the eigenvalues should be equal to 1/nb, that is, $$\lambda_1 = \lambda_2 = \ldots = \lambda_{nb} = \frac{1}{nb}.$$

Thus, to the extent that the size of the largest eigenvalue, $\lambda_1$, is different from $(nb)^{-1}$, this is an indicator of the presence of coherent information within the analysis window. Similarly, the eigenvalues are diagnostic for situations wherein there are conflicting dips within the analysis window. For example, when the seismic reflectors within the analysis window are found to be configured similar to those illustrated in FIG. 8, it should be the case that $\lambda_1 \approx \lambda_2$ and $\lambda_i \approx 0$, for i=3, nb. Thus, examination of the seismic attribute $\lambda_2$ would provide a related—but conceptually different— view of the seismic data than is provided by a display of $\lambda_1$. A display based on the seismic attribute $\lambda_1-\lambda_2$, if values near zero are highlighted in the display, will tend to emphasize those regions of the seismic data with reflector properties similar to those illustrated in FIG. 8. As a further example, an attribute map based on the value $\lambda_{nb}$, the smallest of the eigenvalues, will tend to reveal those regions of the seismic data that are dominated by incoherent or nearly random noise. Finally, the calculated quantity:

$$\lambda' = Tr(S) - \sum_{j=1}^{k} \lambda_j, k < nb,$$

also functions as an incoherent noise indicator, but is in general somewhat more robust than an attribute display formed from $\lambda_{nb}$ alone.

Finally, those skilled in the art will realize that any of the other individual eigenvalues of the similarity matrix might prove to be an indicator of structural and stratigraphic features within seismic data that are often associated with the accumulation of hydrocarbons. Additionally, these eigenvalues may also be used in a general functional expression to produce even more seismic attributes.

Although the eigenvalues of the similarity matrix are useful in their own right, additional use may be made of the eigenvector elements. In more particular, let the vector v, the eigenvector corresponding to the largest eigenvalue, contain elements v[1], v[2], ... v[nb]. For the moment, each of these elements will be assumed to be real valued (i.e., having no imaginary components). However, a method will be disclosed hereinafter which can be used when the eigenvector elements are complex.

Figure 5:
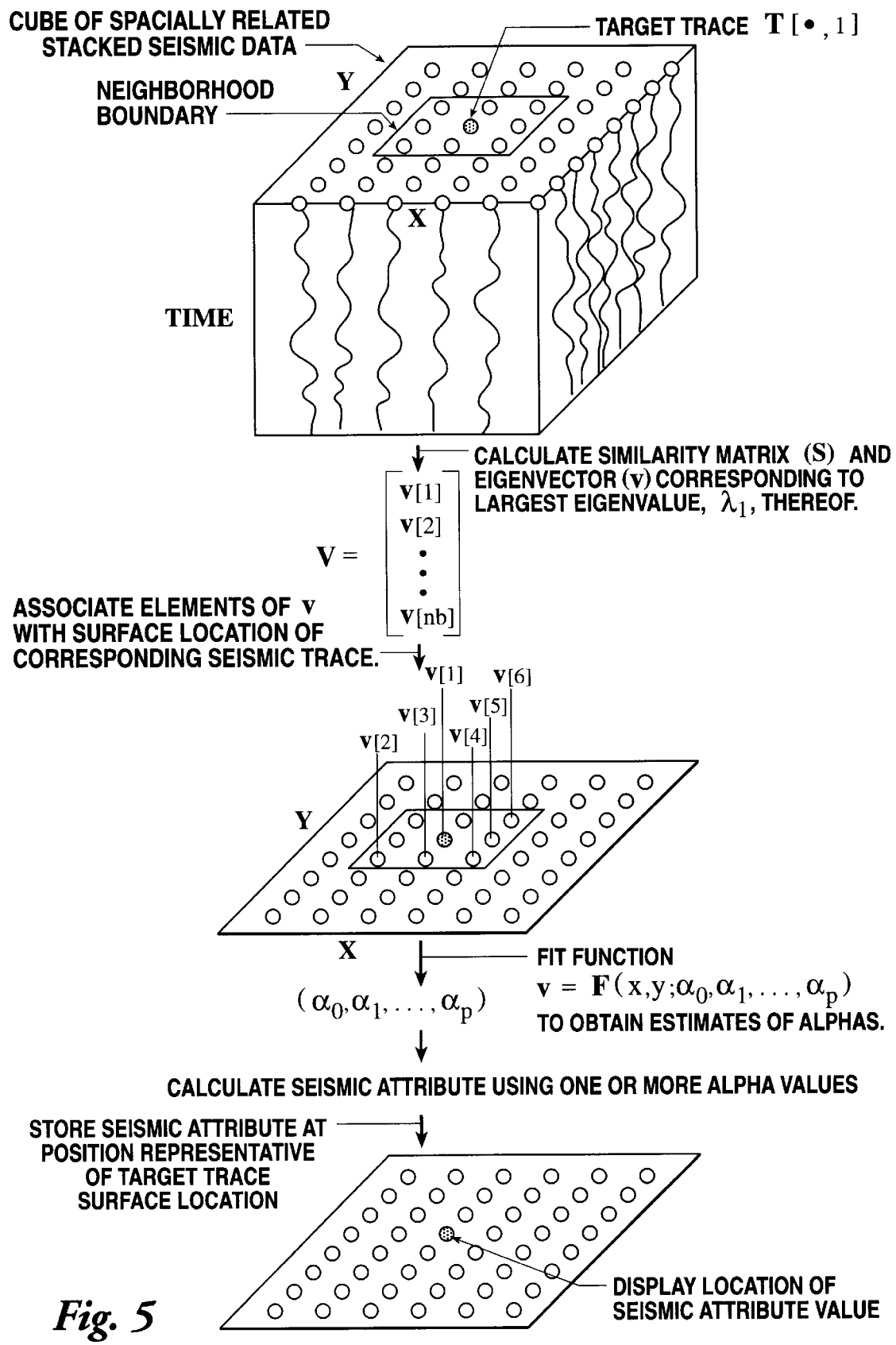
FIG. 5 illustrates the how the similarity matrix eigenvector elements form a surface to which a function may be fit.

Note that each of the eigenvector elements is associated with a particular seismic trace, which in turn, has a position on the surface of the earth. Now, as is generally illustrated in FIG. 5, when each eigenvector element is displayed at a location representative of the corresponding trace surface position, a 3-D surface is revealed. Based on this observation, the instant inventors have discovered that if a function characterized by one or more constant coefficients is fit to this 3-D surface, the constants thereby determined are seismic attributes that are representative in many cases of subsurface features of interest. Thus, as a next step in the instant invention, a function will be selected and a best fit representation of said function will be used to approximate this eigenvector element-determined surface. In more particular, consider the equation $$v=F(x, y; \alpha_0, \alpha_1, \alpha_2, \ldots \alpha_M),$$

where F is a function which is characterized by constants $\alpha_0$, $\alpha_1, \alpha_2, \ldots, \alpha_M$ and which depends on the offset X and Y coordinates of each seismic trace in the neighborhood. By way of illustration only, one such function that has proven to be useful in the exploration for hydrocarbons is a second order trend surface equation, wherein the following expression is fit to the eigenvector elements:

$$v=F(x,y; \alpha_0, \alpha_1, \alpha_2, \ldots, \alpha_M)=\alpha_0+\alpha_1 x+\alpha_2 y+\alpha_3 x^2+\alpha_4 y^2+\alpha_5 xy.$$

The variable "v" in the previous equation stands generically for any eigenvector element and x and y represent the corresponding offset distances as defined previously. The previous function can be rewritten in matrix form using known quantities as follows:

$$\begin{bmatrix} v[1] \\ v[2] \\ \vdots \\ v[np] \end{bmatrix} \cong \begin{bmatrix} 1 & x_1 & y_1 & x_1^2 & y_1^2 & x_1 y_1 \\ 1 & x_2 & y_2 & x_2^2 & y_2^2 & x_2 y_2 \\ \vdots & \vdots & \vdots & \vdots & \vdots & \vdots \\ 1 & x_{np} & y_{np} & x_{np}^2 & y_{np}^2 & x_{np} y_{np} \end{bmatrix} \begin{bmatrix} \alpha_0 \\ \alpha_1 \\ \alpha_2 \\ \alpha_3 \\ \alpha_4 \\ \alpha_5 \end{bmatrix}$$

or in terms of matrices, $$v \cong A\alpha,$$

where the symbol "$\cong$" has been used to indicate that the unknown constants (alpha) are to be chosen such that the left and right hand sides of the equation are as nearly equal as possible; where the matrix of surface position information has been represented as "A"; and where the vector of unknown coefficients has been designated as "$\alpha$". It is well known to those skilled in the art that under standard least squares theory, the choice of the alpha vector which minimizes the difference between v and A$\alpha$ is:

$$\alpha=(A^T A+\epsilon I)^{-1} A v,$$

where the superscript "−1" indicates that a matrix inverse is to be taken. Additionally, the quantity I represents the nb by nb identity matrix and $\epsilon$ is a small positive number which has been introduced—as is commonly done—for purposes of stabilizing the matrix inversion. Finally, those skilled in the art will recognize that the least squares minimization of the trend surface matrix equation is just one of many norms that might be used to constrain the problem and thereby yield a solution in terms of the unknown alphas, some alternative norms being, by way of example only, the $L_1$ or least absolute deviation norm, the $L_p$ or least "p" power norm, and many other hybrid norms such as those suggested in the statistical literature on robust estimators. See, for example, Peter J. Huber, *Robust Statistics,* Wiley, 1981.

The alpha coefficients that are produced by this process provide a wealth of seismic attributes which may be mapped and analyzed. Some examples are given hereinafter of how these coefficients have been used in practice, but the suggestions detailed below represent only a few of the many uses to which these coefficients may be put.

First, the present inventors have recognized that $\alpha_0$ represents an estimate of the broadband reflectivity at the center of the analysis window. Thus, by accumulating—first a plane then—a volume, of $\alpha_0$ coefficients, a reflectivity attribute display is thereby produced. Additionally, $\alpha_1$ and $\alpha_2$ are estimates of the change in reflectivity in the in-line (X) or cross-line (Y) directions, respectively. Similarly, the coefficients $\alpha_3$ and $\alpha_5$ represent the rate of change, or second derivative, of the reflection amplitudes in the X and Y directions.

Those skilled in the art will recognize that a trend surface analysis is just one of any number of methods of fitting a function to a collection of (x,y,z) triplets, the "z" being provided by the values of the selected eigenvector. By way of example only, higher order polynomials might be fit (e.g., a polynomial in $x^3$ and $y^3$), with the alpha coefficients obtained therefrom subject to a similar interpretation. On the other hand, any number of non-linear functions such as, for example, $$z=\alpha_1 e^{-(\alpha_2 x+\alpha_3 y)}$$

or, $$z=\alpha_0+\alpha_1 \cos(\Delta kx)+\alpha_2 \sin(\Delta kx)+\alpha_3 \cos(\Delta ky)+\alpha_4 \sin(\Delta ky)+\alpha_5 \cos(2\Delta kx)+\ldots,$$

where $\Delta k$ is a wavenumber analysis increment measured in radians per meter. Either of these two non-linear examples would thereby yield coefficients (the alphas) that are seismic attributes representative of still other facets of the seismic data.

One additional related use for v arises in the computation of an attribute based on the principal components of the matrix S. Let, the seismic attribute $\lambda_{pc}$ be defined by the following expression:

$$\lambda_{PC} = \sum_{i=1}^{nb} v[i] T[M_t + L/2, i].$$

That is, $\lambda_{pc}$ is a weighted sum of the seismic samples—one sample being contributed per neighborhood trace—at the center of the analysis window, where the weights are provided by the elements of the eigenvector v. Those skilled in the art will recognize that $\lambda_{pc}$ is the first principle component of the "time slice" data vector at sample number $M_t+L/2$ with respect to the matrix S. The quantity $\lambda_{pc}$ represents an average value of the seismic reflections within an incremental analysis volume around, and lying on a wavefront passing through, the time point being analyzed, in this case the center of the analysis window. In other words, it is the best estimate of a wave's value at the time point in question. It is also a measure of the reflectivity at the point, as measured in the 3-D direction that maximizes the magnitude of that measure.

As a final example of the scope of the techniques disclosed herein, the instant inventors have also discovered that these same methods can be applied with slight modifications to prestack moveout-corrected seismic data gathers—either 2-D or 3-D—to provide a new approach to traditional amplitude variation with offset (AVO) analyses. The general approach to utilizing this method is illustrated in FIG. 9. For a discussion of some conventional AVO methods, see, for example, *Avo Analysis: Tutorial & Review,* by J. Castagna, appearing in *Offset-Dependent-Reflectivity— Theory and Practice of AVO Analysis,* John Castagna and Milo Backus (editors), SEG Press, 1993, the disclosure of which is incorporated herein by reference.

As the instant method is applied to AVO investigations, the analysis centers on unstacked seismic traces, preferably after the application of normal moveout correction and prestack migration. During the geometry processing step (FIG. 2), each unstacked trace in a 3-D survey is assigned to a particular cell or "bin," the traces within each bin ultimately giving rise to a single stacked seismic trace. As those skilled in the art know, the bin assignment is based on surface positions of the shot and receiver combination that gave rise to each trace. In FIG. 9, one such bin, and the traces contained therein, has been illustrated for a 3-D survey. Note that the surface coordinates of the center of each bin will become the location that is typically assigned to the stacked seismic trace for that bin.

As a first step in the instant embodiment, the unstacked traces in the gather that fall within a predefined neighborhood region about the CMP location (i.e., target location) are selected and extracted. In this embodiment a target trace would not normally be identified and extracted, although that certainly could be done. After the unstacked traces within the neighborhood are extracted, a surface location is determined for each one. These locations will be represented, as before, by $X_j$ and $Y_j$, j=1, nb. However, rather than computing the distance from each trace to a target trace, in this embodiment the offset distances are computed relative to the surface location of the CMP for this bin:

$$x_j = X_j - X_{CMP}, j=1, nb$$

$$y_j = Y_j - Y_{CMP}, j=1, nb,$$

where $X_{CMP}$ and $Y_{CMP}$ are the X and Y surface locations of the CMP. For 3-D data, the surface location of a CMP is typically the geographic center of the bin which defines that CMP.

As before, an inter-trace similarity matrix is computed from the extracted traces. Thereafter the analysis proceeds as has been discussed previously. In the preferred case, every CMP in the volume will be analyzed by this method.

If a number of CMP bins are analyzed as suggested above, a plane of seismic attributes will result. Each calculated attribute will correspond to a particular CMP and should preferably be displayed at a position that is representative of the surface location of that CMP. By selecting additional analysis windows, a volume of seismic attributes can be produced.

The seismic attributes that are obtained via this process relate generally to variations in offset dependent reflectivity within a gather. Changes in reflectivity with offset are known to those skilled in the art to often be associated with the presence of hydrocarbons, thus this particular embodiment is potentially of substantial importance. Unstacked seismic data that are analyzed in the manner suggested above will yield various seismic attributes that, in turn, are responsive to changes in the underlying seismic reflectivity. Thus, the explorationist that is seeking to locate AVO effects in a 3-D volume can use this method to produce a cube of seismic attributes that can be quickly scouted for evidence of AVO effects.

FORMING THE COMPLEX SIMILARITY MATRIX

According to a second aspect of the present invention, there is provided a method for the generation of seismic attributes substantially similar to that presented above, wherein the calculation of the similarity matrix, S, is accomplished by the method disclosed hereinafter. A flowchart that illustrates the steps of a preferred embodiment of this method may be found in FIGS. 6A and 6B.

In more particular, the method of computing the complex similarity matrix used herein is based on the following observation. It is well known to those skilled in the art that the frequency domain representation of the cross-correlation between two time series may be calculated by multiplying together the Fourier transform coefficients of one series and the complex conjugate of the Fourier transform coefficients of the other series. In terms of equations, if $\Im\{T[\bullet,i]\}$ represents the discrete Fourier transform of the "ith" trace in the temporary storage array, then the product $\Im\{T[\bullet,i]\}$ $\Im\{T[\bullet,j]\}^*$ is the discrete frequency domain representation of the Fourier transform of the cross-correlation between the time series. Thus, by calculating the inverse discrete Fourier transform of the product $\Im\{T[\bullet,i]\}$ $\Im\{T[\bullet,j]\}^*$, the cross-correlation between the seismic traces at all possible time shifts, or "lags", will be obtained. This result is well known to those skilled in the art, and details may be found in, for example, Brigham, *The Fast Fourier Transform,* 1974, Chapter 7, pages 110–122, the disclosure of which is incorporated herein by reference.

Consider for a moment, however, the problem of estimating the cross-correlation function of two time series at a single frequency, say at 30 cycles-per-second (or "Hertz"). A natural way to do this is to evaluate and conjugate multiply together the Fourier transforms of the two series at this frequency, thereby obtaining a frequency domain representation of the cross-correlation (a "cross-spectrum"). The problem with such a cross-spectrum estimator, of course, is that it uses only a single Fourier transform value (or coefficient) from each trace, and thus the product will tend to be a non-robust and a relatively unstable estimator of the cross-spectrum/cross-correlation. However, the instant inventors have discovered a method of combing estimates of the cross-spectrum measured at a variety of frequencies, thereby obtaining a stable and reliable estimator of the cross-spectrum.

As a first step a reference (or projection) frequency must be selected, the reference frequency being the frequency at which the cross-spectra of pairs of seismic traces are to be estimated. The reference frequency is preferably selected from within the normal seismic bandwidth, which extends from about 10 hertz to 80 hertz for conventional seismic data. Let this frequency be denoted by $\omega_R$, which is conventionally measured in radians per second, or, alternatively, $2\pi f_R$, where $f_R$ is the radial frequency measured in Hertz. Further, let $d_R[j]$, j=1, nb, be a vector containing the discrete Fourier transform coefficients at the reference frequency for each trace in the neighborhood:

$$d_R[j] = \sum_{k=0}^{L-1} T[k + M_t, j] e^{-i\omega_R k \Delta t}.$$

Thus, in order to determine the cross-spectrum at frequency $\omega_R$ for traces $T[\bullet,i]$ and $T[\bullet,j]$ within the analysis window, a natural estimator would be the product $d_R[i]\, d_R[j]^*$. An initial estimate of S, the complex similarity matrix, may then be formed by taking the vector outer product between the column vector, $d_R$, and its complex conjugate transpose:

$$S_R = d_R d_R^H,$$

where the superscript "H" has been used to indicate the "Hermitian transpose" matrix operation (matrix transposition combined with complex conjugation of its elements). Thus, the matrix $S_R$ contains all of the single frequency estimates of the cross-spectra for each pair of traces in the neighborhood.

Now, calculate the discrete Fourier transform coefficients at a plurality of other frequencies (auxiliary frequencies), $\omega_\eta$, $\eta=1$, K, each of the $\omega_\eta$ being chosen to lie within the typical seismic spectral band, $$d_\eta[j] = \sum_{k=0}^{L-1} T[k + M_t, j] e^{-\omega_\eta k \Delta t},$$

$\omega_\eta$ being measured in radians per second, and the first element of $d_\eta$ being the Fourier transform coefficient at this frequency from the reference trace. However, before these coefficients can be combined with those of the reference frequency and used to estimate the inter-trace similarity, each must first be "phase compensated" relative to the reference frequency.

This phase compensation might be done in any number of ways, but the instant inventors have conceived a novel method of so doing. One method for combining these several frequencies is suggested in, for example, Allam and Moghaddamjoo, *Spatial-Temporal DFT Projection for Wideband Array Processing, IEEE Signal Processing Letters*, vol. 1, No. 2., February 1994, pp. 35–37, the disclosure of which is incorporated herein by reference. However, the Allam and Moghaddamjoo method is limited in its disclosure to 2-D data, unlike the 3-D methodology considered herein. Additionally, the dip-limited plane wave expansion method disclosed hereinafter is more accurate and, therefore, produces a more reliable and useful result when dealing with aliased data. Finally, the Allam and Moghaddamjoo method is performed in the Fourier f-k—or 2-D Fourier transform—domain and this approach could certainly be used in practice on 2-D data. (For a discussion of the 2-D Fourier transform in the seismic context see, for example, Chapter 1.6, pages 62–79, of *Seismic Data Processing* by Ozdogan Yilmaz, Society of Exploration Geophysicists, 1987, the disclosure of which is incorporated herein by reference.) However, the instant inventors have found it preferable to do the required phase compensation using a 3-D discrete Radon transform. (A general discussion of the Radon transform in the seismic context may be found in Marfurt, Schneider, and Mueller, *Pitfalls of Using Conventional and Discrete Radon Transforms on Poorly Sampled Data*, 61 Geophysics 1467–1482, 1996, the disclosure of which is incorporated herein by reference.)

In the preferred embodiment, the matrix equation that describes the phase-correction that must be applied to the Fourier coefficients at frequency, $\omega_\eta$, to make them comparable to the coefficients at the reference frequency, $\omega_R$, is given by the following matrix expression:

$$D_\eta = P_R (P_\eta^H P_\eta + \epsilon I)^{-1} P_\eta^H d_\eta,$$

where $D_\eta$ is the phase-compensated coefficient vector, and where $\epsilon$ is a small pre-whitening factor which is present to stabilize the matrix inversion. The matrix $P_\eta$ is a discrete Radon transform matrix and has elements $P_\eta[m,n]$:

$$P_\eta[m,n(p,q)] = \exp[-i\omega_\eta(p\Delta p x_m + q\Delta q y_m)]$$

where the integers p and q are limited in their respective ranges to, $$-N_p \leq p \leq +N_p, -N_q \leq q \leq +N_q;$$

where I is the $(2N_p+1)(2N_q+1)$ by $(2N_p+1)(2N_q+1)$ identity matrix; and $$P_R[m,n(p,q)] = \exp[-i\omega_R(p\Delta p x_m + q\Delta q y_m)].$$

The notation "exp[x]" has been used to represent $e^x$. Typical values for $\Delta p$ and $\Delta q$ are 0.05 ms/meter, where $N_p$ and $N_q$ are equal to 10, thereby providing coverage for slopes for seismic events ranging from between −0.5 and 0.5 ms/meter. Note that the column vectors $D_\eta$ and $d_\eta$ are of length nb, and that the matrices $P_\eta$ and $P_R$ contain nb rows and $(2N_p+1)(2N_q+1)$ columns.

A slight change to the previous formula is suggested if the complex similarity matrix is being computed from unstacked data, e.g., if the analysis is done for AVO purposes. Rather than using $P_\eta$ as defined above, the instant inventors suggest that a parabolic or hyperbolic Radon transform of the sort discussed in Marfurt, Schneider, and Mueller, cited supra, would be more appropriate. In more particular, the matrix elements in $P_\eta$ would be replaced by the those of the following expression:

$$P_\eta[m,n(p,q)] = \exp[-i\omega_\eta(p\Delta p x_m^2 + q\Delta q y_m^2)],$$

where $x_m$ and $y_m$ denote the separation between trace and CMP in the x and y directions, as was discussed previously. Note that the offset variables are squared in this case.

Returning to the discussion of the use of the complex similarity matrix with stacked data, the column index in the previous equation, n(p,q), has been written in this fashion to emphasize that each column of $P_\eta$ corresponds to a different fixed pair of p and q integer values. As is illustrated in FIG. 7, the matrix $P_\eta$ (as it is applied to conventional/stacked seismic data) contains columns corresponding to each of the $(2N_p+1)(2N_q+1)$ possible combinations of the two integers p and q. Note also that each row of $P_\eta$ corresponds to a different neighborhood trace. The row corresponding to the target trace—the first row in FIG. 7—has elements that are identically equal to unity ($e^0=1$) because the target trace offset distances $x_1$ and $y_1$ are zero. If there is no target trace, the first row of $P_\eta$ will have the same form as the others.

Any number of phase-compensated single frequency matrices may be combined to produce a more robust multi-frequency complex similarity matrix by way of the following expression:

$$S = S_R + \sum_\eta D_\eta D_\eta^H = S_R + \sum_\eta S_\eta,$$

where $S_\eta$ is the phase adjusted single frequency complex similarity matrix at frequency $\omega_\eta$:

$$S_\eta = D_\eta D_\eta^H.$$

That is, the matrix S is created by summing together all of the phase-corrected Fourier transform coefficient cross products with the reference frequency matrix, $S_R$. Each element of S, $S[i,j]$, is a frequency domain representation of the similarity between the "ith" and "jth" traces. The instant inventors have found that for conventional seismic data—when using an 80 ms analysis window and a seismic bandwidth of approximately 10 to 60 Hertz—calculating single frequency complex similarity matrices at six to eight auxiliary frequencies which have been spaced so as to roughly span the seismic spectrum produces acceptable results. Additionally, it is not necessary for the instant method that every frequency component be added into the S matrix: if one frequency component is particularly contaminated by noise, that frequency may be simply eliminated from the sum. In the U.S., the 60 Hertz band (50 Hertz in Europe) is often contaminated by electrical noise from nearby power lines and, thus, an auxiliary frequency near 60 Hertz might not be added into the sum in many cases.

The matrix S as described above in connection with the instant embodiment will in general contain complex elements that represent the similarities between all traces in the neighborhood. Further, rather than being a symmetric matrix, it will instead be conjugate symmetric (or Hermitian as described previously). Thus, this matrix may be used in a fashion that is somewhat different from that discussed above for real valued matrices.

In more particular, the first step in the analysis of S will be to calculate the eigenvector that best represents the data. By mathematical convention, that eigenvector will correspond to the largest eigenvalue of S, $\lambda_1$. Note that, because the matrix S is Hermitian, its eigenvalues will all be real. However, the elements of its eigenvectors will, in general, be complex valued. Thus, in this preferred embodiment the instant inventors have chosen to analyze separately the magnitude and phase components of the complex valued eigenvector, v.

To analyze the magnitude portion of v, a trend surface function (or other functional form) dependant on a plurality of alphas will be fit to the magnitudes of the elements of v:

$$\begin{bmatrix} |v[1]| \\ |v[2]| \\ \vdots \\ |v[np]| \end{bmatrix} \cong \begin{bmatrix} 1 & x_1 & y_1 & x_1^2 & y_1^2 & x_1 y_1 \\ 1 & x_2 & y_2 & x_2^2 & y_2^2 & x_2 y_2 \\ \vdots & \vdots & \vdots & \vdots & \vdots & \vdots \\ 1 & x_{np} & y_{np} & x_{np}^2 & y_{np}^2 & x_{np} y_{np} \end{bmatrix} \begin{bmatrix} \alpha_0 \\ \alpha_1 \\ \alpha_2 \\ \alpha_3 \\ \alpha_4 \\ \alpha_5 \end{bmatrix},$$

where the notation $|v[1]|$ indicates that the magnitude is to be taken of the functional argument:

$$|v[1]| = \sqrt{\text{Real}(v[1])^2 + \text{Imaginary}(v[1])^2}.$$

The coefficients obtained by this approach will have an interpretation identical to that discussed previously. The solution to this expression is given by the familiar expression:

$$\alpha = (A^T A + \epsilon I)^{-1} A \text{ Mag}(v),$$

where Mag(v) is a column vector that contains the magnitudes of the complex elements of v.

To analyze the phase portion of v, a function (trend surface or otherwise) which is characterized by a collection of constants, $\beta_i$, will be fit to the phase components of the complex eigenvector elements. As the method is applied to a traditional trend-surface fit, the betas are chosen to minimize the least squares difference between the left and right hand side of the equation that follows:

$$\begin{bmatrix} Arg(v[1]) \\ Arg(v[2]) \\ \vdots \\ Arg(v[np]) \end{bmatrix} \cong \begin{bmatrix} 1 & x_1 & y_1 & x_1^2 & y_1^2 & x_1 y_1 \\ 1 & x_2 & y_2 & x_2^2 & y_2^2 & x_2 y_2 \\ \vdots & \vdots & \vdots & \vdots & \vdots & \vdots \\ 1 & x_{np} & y_{np} & x_{np}^2 & y_{np}^2 & x_{np} y_{np} \end{bmatrix} \begin{bmatrix} \beta_0 \\ \beta_1 \\ \beta_2 \\ \beta_3 \\ \beta_4 \\ \beta_5 \end{bmatrix}$$

where, the function "Arg(v[1])" returns the phase of a complex value:

$$Arg(ae^{i\theta}) = 0.$$

As before, the solution to the previous matrix equation is given by:

$$\beta = (A^T A + \epsilon I)^{-1} A \text{ Arg}(v),$$

where Arg(v) is a column vector that contains the phase components of the elements of the eigenvector v.

The beta coefficients may now be displayed individually, or combined together, to produce a variety of seismic attributes which measure different aspects of the seismic data than the aspects captured by the alphas discussed previously. For example, the present inventors have found that $\beta_1$ and $\beta_2$ correspond to a broadband estimate of the apparent reflector dips in the X and Y directions respectively, while the coefficients $\beta_3$ and $\beta_5$ are estimates of the reflector curvature in the X and Y directions. Finally, the coefficient of xy ($\beta_4$) is not commonly used in structural interpretation, but is equivalent to the skewness coefficient used in texture and segmentation analyses.

Additionally, the $\beta$ coefficients may be mathematically combined to yield still further seismic attributes. By way of example only, one such combination is obtained by adding together the $\beta_3$ and $\beta_5$ coefficients. When this is done, a composite estimate of the reflector curvature, $\rho$, is produced:

$$\rho = \nabla^2 \psi = \frac{\partial^2 \psi}{\partial x^2} + \frac{\partial^2 \psi}{\partial y^2} \cong \beta_3 + \beta_5,$$

where the variable $\psi$ has been used to represent the unknown function that describes the shape of a particular reflector as it appears on the neighborhood traces within the analysis window.

One of the chief advantages of the complex similarity matrix approach described previously is that a similarity matrix has been produced without the customary time-domain search for a maximum lag of a cross-correlation. When a conventional cross-correlation is used a measure of similarity, it is usually necessary to search of a number of time lags (positive and negative) and select the maximum value of the cross-correlation function to use as the measure of inter-trace similarity. In this present embodiment, however, a similarity value is determined which does not require a time-domain search for a maximum. This means, among other things, that the process of calculating a similarity matrix may be more reliably automated, as it is not subject to "mispicks" caused by leg jumps, etc.

In the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons. By way of additional examples, the same approach described herein could be used to process and/or analyze multi-component seismic data, shear wave data, magneto-telluric data, cross well survey data, full waveform sonic logs, or model-based digital simulations of any of the foregoing. Additionally, the methods claimed herein after can be applied to transformed versions of these same data traces including, for example: frequency domain Fourier transformed data; transformations by discrete orthonormal transforms; instantaneous phase, instantaneous frequency, analytic traces and quadrature traces; etc. In short, the process disclosed herein can potentially be applied to any collection of geophysical time series, and mathematical transformations of same, but it is preferably applied to a collection of spatially related time series containing structural and stratigraphic features. Thus, in the text that follows those skilled in the art will understand that "seismic trace" is used herein in a generic sense to apply to geophysical time series in general.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method for the exploration of hydrocarbons, wherein a predetermined volume of the earth containing structural and stratigraphic features has been specified, comprising:

(a) obtaining a representation of a set of spatially related seismic traces distributed over said pre-determined volume of the earth, said spatially related seismic traces containing signals representative of at least a portion of said structural and stratigraphic features, and each of said spatially related seismic traces being associated with a location on a surface of the earth;

(b) selecting a target location on the surface of the earth, said target location having at least three spatially related seismic traces proximate thereto;

(c) selecting at least three traces from said at least three spatially related seismic traces proximate to said target location;

(d) calculating a complex similarity matrix from said selected traces;

(e) calculating a seismic attribute from said complex similarity matrix;

(f) storing said seismic attribute at a position representative of said target location; and, (g) repeating steps (b) through (f) for at least two additional target locations, thereby creating a stored plane of seismic attributes, said stored plane of seismic attributes being used to identify subsurface structural and stratigraphic features that are conducive to the migration, accumulation, or presence of hydrocarbons.

2. A method for the exploration of hydrocarbons according to claim 1 comprising the additional step of (h) displaying at least a portion of said stored plane of seismic attributes.

3. A method according to claim 2, wherein the step of displaying at least a portion of said plane of seismic attributes includes the further step of recording visually perceptible images representative of said plane of seismic attributes on a generally flat medium.

4. A method according to claim 3, wherein said generally flat medium includes a computer monitor.

5. A method according to claim 1, wherein the complex similarity matrix of step (d) has a plurality of eigenvalues, and where the step of calculating a seismic attribute in step (e) comprises the steps of:

(1e) calculating at least one eigenvalue of said complex similarity matrix, (2e) calculating a seismic attribute from any eigenvalues so calculated.

6. A method according to claim 5, wherein the complex similarity matrix has a largest eigenvalue, wherein the eigenvalue calculated in step (1e) is said largest eigenvalue, and wherein the seismic attribute calculated in step (2e) is said largest eigenvalue.

7. A method according to claim 1, wherein the complex similarity matrix of step (d) has a plurality of eigenvectors, and where the step of calculating a seismic attribute in step (e) comprises the steps of:

(1e) calculating at least one eigenvector of said complex similarity matrix, and, (2e) calculating a seismic attribute from any eigenvectors so calculated.

8. A method according to claim 7, wherein the step of calculating a seismic attribute in step (2e) comprises the steps of:

(i) choosing an eigenvector from among those so calculated, said chosen eigenvector containing eigenvector elements, (ii) associating each eigenvector element with an eigenvector element surface location, said eigenvector element surface location consisting of an X coordinate and a Y coordinate, (iii) numerically fitting a function characterized by constant coefficients to said eigenvector elements and said eigenvector element surface locations, thereby obtaining one or more constant coefficient estimates, and (iv) calculating a seismic attribute from any of said constant coefficient estimates so obtained.

9. A method according to claim 8 wherein the function of step (iii) is a trend surface function.

10. A method according to claim 9 wherein the trend surface function is a second order trend surface function.

11. A method according to claim 8
    wherein the complex similarity matrix has a plurality of eigenvalues,
    wherein there is a largest eigenvalue among said plurality of eigenvalues,
    wherein said largest eigenvalue corresponds to an eigenvector of said complex similarity matrix, and
    wherein the eigenvector chosen in step (i) is said eigenvector that corresponds to said largest eigenvalue.

12. The process of claim 1, wherein at least steps (b) through (g) are digitally encoded as a set of instructions for programming a computer and further including the step of loading said instructions on said computer before performing steps (b) through (g).

13. A device adapted for use by a digital computer wherein a plurality of computer instructions defining the process of claim 12 are encoded, said device being readable by said digital computer, and said computer instructions programming said computer to perform said process.

14. The device of claim 13, wherein said device is selected from the group consisting of a magnetic tape, a magnetic disk, a magneto-optical disk, an optical disk and a CD-ROM.

15. A method for the exploration of hydrocarbons, wherein a stored plane of seismic attributes has been prepared by the method of claim 1, comprising:

(a) accessing said stored plane of seismic attributes; and, (b) displaying at least a portion of said stored plane of seismic attributes.

16. A method according to claim 1
wherein a zone of interest has been specified,
wherein an analysis window within said zone of interest has been specified,
wherein said selected traces contain digital samples, said digital samples being characterized by at least a time, a location, and an amplitude,
and wherein step (d) comprises the steps of:

(1d) identifying for each selected trace the digital samples falling within said analysis window, and, (2d) calculating a complex similarity matrix from said digital samples so identified.

17. A method according to claim 16, wherein steps (b) through (g) are performed for at least two different specified analysis windows within said zone of interest, thereby producing at least two stored planes of seismic attributes.

18. A method of geophysical exploration for subsurface structural and stratigraphic features within seismic data that may be associated with the migration, accumulation, or presence of hydrocarbons according to claim 17, wherein said stored seismic attribute planes are formed into a stored seismic attribute cube.

19. A method of geophysical exploration according to claim 18, comprising the additional step of:

(g) displaying at least a portion of said stored seismic attribute cube.

20. A method according to claim 1 wherein the step of storing said seismic attribute at a position representative of the surface location of the target trace comprises the step of storing in computer RAM said seismic attribute at a position representative of the surface location of the target trace.

21. A seismic map for use in geophysical exploration prepared by a process, comprising the steps of:

(a) accessing, by means of a computer, a data set comprising seismic traces distributed over a pre-determined volume of the earth;

(b) selecting a target seismic trace having a surface location and at least two other seismic traces having surface locations from said set of seismic traces;

(c) calculating a complex similarity matrix from said selected seismic traces;

(d) calculating a seismic attribute from said complex similarity matrix;

(e) storing said seismic attribute at a position representative of the surface location of the target trace; and, (f) repeating steps (b) through (e) for at least two additional target traces, thereby creating a stored plane of seismic attributes; and, (g) converting said stored plane of seismic attributes into a printed display for use in the identification and detection of subsurface features that are conducive to hydrocarbon formation, migration, or occurrence.

22. In a digital computer wherein a data set of spatially related seismic traces obtained over a pre-determined volume of the earth are read into memory, wherein said spatially related seismic traces contain signals representative of at least a portion of said volume, and wherein said digital computer is used to form an attribute display for use in seismic exploration, a digital computer programmed to perform a process comprising the steps of:

(a) selecting at least three seismic traces from said spatially related seismic traces, each of said selected seismic traces being characterized by at least a surface location;

(b) calculating a complex similarity matrix from said selected seismic traces;

(c) calculating a seismic attribute from said complex similarity matrix;

(d) storing said seismic attribute at a position representative of the surface location of one of said selected seismic traces; and, (e) repeating steps (a) through (d) for at least two additional target traces, thereby forming a stored attribute display which can be used to detect subsurface features that are conducive to hydrocarbon formation, migration, or occurrence.

23. A device adapted for use by a digital computer wherein a plurality of computer instructions defining the process of claim 22, are encoded, said device being readable by said digital computer, and said computer instructions programming said computer to perform said process.

24. The device of claim 23, wherein said device is selected from the group consisting of a magnetic tape, a magnetic disk, a magneto-optical disk, an optical disk and a CD-ROM.

25. A method of seismic attribute generation for use in geophysical exploration for hydrocarbons, wherein a reference frequency and a plurality of specified auxiliary frequencies have been provided, comprising the steps of:

(a) obtaining a set of spatially related seismic traces distributed over a 3-D volume of the earth, said spatially related seismic traces containing signals representative of at least a portion of said volume, and each spatially related seismic trace in said set being associated with a surface location;

(b) selecting a target seismic trace and at least two other seismic traces from said set of seismic traces, said target trace having a surface location;

(c) calculating a reference frequency complex similarity matrix at said reference frequency from said selected seismic traces;

(d) choosing an auxiliary frequency from among said specified auxiliary frequencies;

(e) calculating a single frequency phase-corrected complex similarity matrix at said chosen auxiliary frequency from said selected seismic traces;

(f) performing steps (d) and (e) as required until a predetermined number of the specified auxiliary frequencies have been chosen;

(g) combining any phase-corrected single frequency complex similarity matrices calculated in steps (e) and (f) with said reference frequency complex similarity matrix to form a composite complex similarity matrix;

(h) calculating a seismic attribute from said composite complex similarity matrix;

(i) storing said seismic attribute at a position representative of the surface location of said target trace; and, (j) repeating steps (b) through (i) for at least two other target traces, thereby creating a stored plane of seismic attributes which can be used to detect subsurface features that are conducive to hydrocarbon formation, migration, or occurrence.

26. A method according to claim 25 wherein said predetermined number of the specified auxiliary frequencies is numerically equal to unity.

27. A method according to claim 25 wherein step (e) comprises the steps of:

(1e) calculating from each selected seismic trace a Fourier transform at said chosen auxiliary frequency, said Fourier transform producing an auxiliary frequency Fourier transform coefficient for each selected seismic trace, (2e) calculating phase-corrected Fourier transform coefficients from said auxiliary frequency Fourier transform coefficients, and (3e) forming a phase-corrected single frequency similarity matrix at said chosen auxiliary frequency from said phase-corrected Fourier transform coefficients.

28. A method according to claim 25 wherein step (g) comprises the step of summing together any phase-corrected single frequency complex similarity matrices calculated in step (e) with said reference frequency complex similarity matrix to form a composite complex similarity matrix.

29. A method according to claim 25 wherein step (c) comprises the steps of:

(1c) calculating from each selected seismic trace a Fourier transform at said reference frequency, said Fourier transform producing a reference frequency Fourier transform coefficient for each selected seismic trace, and (2c) calculating a reference frequency complex similarity matrix at said reference frequency from said seismic traces by way of the following equation:

$$S_R = d_R d_R^H,$$

where $S_R$ is said reference frequency complex similarity matrix at said reference frequency, and $d_R$ is a vector containing said reference frequency Fourier transform coefficients of step (1c).

30. A method according to claim 25 wherein the step of storing said seismic attribute at a position representative of the surface location of the target trace comprises the step of storing in computer RAM said seismic attribute at a position representative of the surface location of the target trace.

31. A method for the exploration of hydrocarbons, wherein a stored plane of seismic attributes has been prepared by the method of claim 25, comprising:

(a) accessing said stored plane of seismic attributes; and, (b) displaying at least a portion of said stored plane of seismic attributes.

32. A method for the exploration of hydrocarbons according to claim 25 comprising the additional step of:

(k) displaying at least a portion of said stored seismic attribute plane.

33. A method according to claim 32 wherein the step of displaying at least a portion of said stored seismic attribute plane includes the step of displaying at least a portion of said stored seismic attribute plane on a computer monitor.

34. In the exploration for hydrocarbons, a seismic attribute map for use by an explorationist in identifying potential drilling sites, wherein subsurface features associated with the migration, accumulation or presence of hydrocarbons have been accentuated, said map being prepared by a process, said process comprising the steps of:

(a) accessing by means of a computer, a data set comprising spatially related seismic signal traces distributed over a pre-determined volume of the earth, said seismic signal traces being characterized by at least a surface location;

(b) selecting a target location, said target location having at least three seismic signal traces proximate thereto;

(c) selecting at least three seismic traces from said seismic signal traces proximate to said target location;

(d) calculating a complex similarity matrix from said selected seismic traces;

(e) calculating a seismic attribute from said complex similarity matrix;

(f) storing said seismic attribute at a position representative of the surface location of one of the selected seismic traces;

(g) repeating steps (b) through (f) for at least two additional target locations, thereby creating a stored plane of seismic attributes; and, (h) displaying said stored plane of seismic attributes on a generally flat medium for recording visually perceptible images thereon.

35. A method according to claim 34, wherein said generally flat medium includes a computer monitor.

36. A method for the exploration of hydrocarbons, wherein a predetermined volume of the earth containing structural and stratigraphic features has been specified, comprising:

(a) obtaining a representation of a set of spatially related seismic traces distributed over said pre-determined volume of the earth, said spatially related seismic traces containing signals representative of at least a portion of said structural and stratigraphic features, and each of said spatially related seismic traces being characterized by at least a location on a surface of the earth;

(b) selecting a target location on the surface of the earth, said target location having at least three seismic traces proximate thereto;

(c) selecting at least three traces from said at least three seismic traces proximate to said target location;

(d) calculating a similarity matrix from said selected traces, said similarity matrix having a plurality of eigenvectors;

(e) calculating a particular eigenvector of said similarity matrix, said particular eigenvector containing eigenvector elements;

(f) associating each of said eigenvector elements with an eigenvector element surface location;

(g) fitting a function characterized by constant coefficients to said eigenvector elements and said eigenvector element surface locations, thereby obtaining one or more constant coefficient estimates;

(h) calculating a seismic attribute from any of said constant coefficient estimates so obtained;

(i) storing said seismic attribute at a position representative of said target location; and, (j) repeating steps (b) through (i) for at least two additional target locations, thereby creating a stored plane of seismic attributes, said stored plane of seismic attributes being used to identify subsurface structural and stratigraphic features that are conducive to the migration, accumulation, or presence of hydrocarbons, conducive to the migration, accumulation, or presence of hydrocarbons.

37. A method for the exploration of hydrocarbons according to claim 36 comprising the additional step of (k) displaying at least a portion of said stored plane of seismic attributes.

38. A method according to claim 37, wherein the step of displaying at least a portion of said plane of seismic attributes includes the further step of recording visually perceptible images representative of said plane of seismic attributes cube on a generally flat medium.

39. A method according to claim 38, wherein said generally flat medium includes a computer monitor.

40. A method according to claim 36,
wherein said similarity matrix of step (d) has plurality of eigenvalues,
wherein there is a largest eigenvalue among said plurality of eigenvalues, said largest eigenvalue being associated with at least one of said plurality of eigenvectors, and
wherein said particular eigenvector calculated in step (e) is an eigenvector associated with said largest eigenvalue of said similarity matrix.

41. A method according to claim 36 wherein the step of storing said seismic attribute at a position representative of the surface location of the target trace comprises the step of storing in computer RAM said seismic attribute at a position representative of the surface location of the target trace.

42. A method according to claim 36 wherein the function of step (g) is a trend surface function.

43. A method according to claim 42 wherein the trend surface function is a second order trend surface function.

44. The process of claim 36, wherein at least steps (b) through (j) are digitally encoded as a set of instructions for programming a computer and further including the step of loading said instructions on said computer before performing steps (b) through (j).

45. A device adapted for use by a digital computer wherein a plurality of computer instructions defining the process of claim 44 are encoded, said device being readable by said digital computer, and said computer instructions programming said computer to perform said process.

46. The device of claim 45, wherein said device is selected from the group consisting of a magnetic tape, a magnetic disk, a magneto-optical disk, an optical disk and a CD-ROM.

47. A method for the exploration of hydrocarbons, wherein a stored plane of seismic attributes has been prepared by the method of claim 36, comprising:
(a) accessing said stored plane of seismic attributes; and,
(b) displaying at least a portion of said stored plane of seismic attributes.

48. A method according to claim 36
wherein a zone of interest has been specified,
wherein an analysis window within said zone of interest has been specified,
wherein said selected traces contain digital samples, said digital samples being characterize by at least a time, a location, and an amplitude,
and wherein step (d) comprises the steps of:
(1d) identifying for each selected trace the digital samples falling within said analysis window, and,
(2d) calculating a complex similarity matrix from said digital samples so identified.

49. A method according to claim 48, wherein steps (b) through (j) are repeated for at least two different specified analysis windows within said zone of interest, thereby producing at least two stored planes of seismic attributes.

50. A method of geophysical exploration for subsurface structural and stratigraphic features within seismic data that may be associated with the migration, accumulation, or presence of hydrocarbons according to claim 49, wherein said stored seismic attribute planes are formed into a stored seismic attribute cube.

51. A method of geophysical exploration according to claim 50, comprising the additional step of:
(k) displaying at least a portion of said stored seismic attribute cube.

52. A seismic map for use in geophysical exploration, said map prepared by a process comprising the steps of:
(a) accessing, by means of a computer, a data set comprising seismic traces distributed over a pre-determined volume of the earth;
(b) selecting a target seismic trace having a surface location and at least two other seismic traces having surface locations from said set of seismic traces;
(c) calculating a similarity matrix from said selected seismic traces, said similarity matrix having a plurality of eigenvectors;
(d) calculating a particular eigenvector of said similarity matrix, said particular eigenvector having eigenvector elements;
(e) associating each of said eigenvector elements with a surface location;
(f) fitting a function characterized by constant coefficients to said eigenvector elements and said surface locations, thereby obtaining one or more constant coefficient estimates;
(g) calculating a seismic attribute from any of said constant coefficient estimates so obtained;
(h) storing said seismic attribute at a position representative of the surface location of the target trace; and,
(i) repeating steps (b) through (h) for at least two additional target traces, thereby creating a stored plane of seismic attributes; and,
(j) converting said stored plane of seismic attributes into a printed display for use in the identification and detection of subsurface features that are conducive to hydrocarbon formation, migration, or occurrence.

53. In a digital computer wherein a data set of spatially related seismic traces obtained over a pre-determined volume of the earth are read into memory, and wherein said digital computer is used to form an attribute display for use in seismic exploration, a digital computer programmed to perform a process comprising the steps of:
(a) selecting a target seismic trace and at least two other seismic signal traces from said spatially related seismic traces;
(b) calculating a similarity matrix from said selected seismic traces, said similarity matrix having a plurality of eigenvectors;
(c) calculating a particular eigenvector of said similarity matrix, said eigenvector consisting of eigenvector elements;
(d) associating with each of said eigenvector elements a location;
(e) fitting a function characterized by constant coefficients to said eigenvector elements and said locations, thereby obtaining one or more constant coefficient estimates;
(f) calculating a seismic attribute from any of said constant coefficient estimates so obtained;
(g) storing said seismic attribute at a position representative of the surface location of the target trace; and,
(h) repeating steps (b) through (g) for at least two additional target traces, thereby creating a stored attribute display, said stored attribute display being used to identify subsurface structural and stratigraphic features that are conducive to the migration, accumulation, or presence of hydrocarbons.

54. A device adapted for use by a digital computer wherein a plurality of computer instructions defining the process of claim 53, are encoded, said device being readable by said digital computer, and said computer instructions programming said computer to perform said process.

55. The device of claim 54, wherein said device is selected from the group consisting of a magnetic tape, a magnetic disk, a magneto-optical disk, an optical disk and a CD-ROM.

56. In the exploration for hydrocarbons, a seismic attribute map for use by an explorationist in identifying subsurface features associated with the migration, accumulation or presence of hydrocarbons, said map being prepared by a process, said process comprising the steps of:

(a) accessing by means of a computer, a data set comprising spatially related seismic traces distributed over a pre-determined volume of the earth, said seismic traces containing digital information representative of subterranean structures and stratigraphy;

(b) selecting at least three seismic traces from said data set of spatially related seismic traces, said selected seismic traces each being characterized by at least a surface location;

(c) calculating a similarity matrix from said selected seismic traces, said similarity matrix having a plurality of eigenvectors;

(d) calculating a particular eigenvector of said similarity matrix, said eigenvector being characterized by a plurality of eigenvector elements;

(e) associating a surface location with each of said plurality of eigenvector elements;

(f) selecting a function characterized by at least one constant coefficient;

(g) fitting said function to said plurality of eigenvector elements and surface locations, thereby producing at least one constant coefficient estimate;

(h) calculating a seismic attribute from any of said constant coefficient estimates so produced;

(i) storing said seismic attribute at a position representative of the surface location of one of said selected seismic traces;

(j) repeating steps (b) through (i) for at least two additional target traces, thereby creating a stored plane of seismic attributes; and, (k) displaying said plane of seismic attributes on a generally flat medium for recording visually perceptible images thereon.

57. A method of geophysical exploration, wherein unstacked seismic traces are analyzed for variations in seismic reflector amplitude with changing offset distance from a CMP location, said method comprising the steps of:

(a) obtaining a representation of an unstacked seismic data set, said unstacked seismic data set being organized into a plurality of CMP gathers, each of said CMP gathers being associated with a location on the surface of the earth and each of said CMP gathers consisting of at least one unstacked seismic trace;

(b) selecting a CMP gather consisting of at least three unstacked seismic traces from said plurality of CMP gathers;

(c) selecting at least three traces from said unstacked seismic traces in said selected CMP gather, each of said selected traces being associated with a location on the surface of the earth;

(d) calculating a similarity matrix from said selected traces, said similarity matrix having a plurality of eigenvectors;

(e) calculating a particular eigenvector of said similarity matrix, said particular eigenvector having eigenvector elements;

(e) associating each of said eigenvector elements with a surface location;

(f) fitting a function characterized by constant coefficients to said eigenvector elements and said surface locations, thereby obtaining one or more constant coefficient estimates;

(g) calculating a seismic attribute from any of said constant coefficient estimates so obtained;

(h) storing said seismic attribute at a position representative of said surface location of said selected CMP gather; and, (i) repeating steps (b) through (h) for at least two additional CMP gathers, thereby creating a stored plane of seismic attributes, said stored plane of seismic attributes being used to identify amplitude variations with offset that are indicative of subsurface features conducive to the accumulation or presence of hydrocarbons.

58. A method for the exploration of hydrocarbons according to claim 57 comprising the additional step of (j) displaying at least a portion of said stored plane of seismic attributes.

59. A method for the exploration of hydrocarbons, wherein a stored plane of seismic attributes representative of variations in seismic reflectivity with offset has been prepared by the method of claim 57, comprising:

(a) accessing said stored plane of seismic attributes; and, (b) displaying at least a portion of said stored plane of seismic attributes.

60. The process of claim 57, wherein at least steps (b) through (i) are digitally encoded as a set of instructions for programming a computer and further including the step of loading said instructions on said computer before performing steps (b) through (i).

61. A device adapted for use by a digital computer wherein a plurality of computer instructions defining the process of claim 60 are encoded, said device being readable by said digital computer, and said computer instructions programming said computer to perform said process.

62. The device of claim 61, wherein said device is selected from the group consisting of a magnetic tape, a magnetic disk, a magneto-optical disk, an optical disk and a CD-ROM.

63. A method for the exploration of hydrocarbons, wherein unstacked seismic traces containing subsurface structural and stratigraphic information are analyzed for AVO effects, comprising the steps of:

(a) obtaining a representation of an unstacked seismic data set, said unstacked seismic data set being organized into a plurality of CMP gathers, each of said CMP gathers being associated with a location on the surface of the earth and each of said CMP gathers consisting of at least one unstacked seismic trace;

(b) selecting a CMP gather consisting of at least three unstacked seismic traces from said plurality of CMP gathers;

(c) selecting at least three traces from said unstacked seismic traces in said selected CMP gather, each of said selected traces being associated with a location on the surface of the earth;

(d) calculating a complex similarity matrix from said selected traces;

(e) calculating a seismic attribute from said complex similarity matrix;

(f) storing said seismic attribute at a position representative of said surface location of said selected CMP gather; and, (g) repeating steps (b) through (f) for at least two additional CMP gathers, thereby creating a stored plane of seismic attributes, said stored plane of seismic attributes being used to identify amplitude variations with offset that are indicative of subsurface features conducive to the accumulation or presence of hydrocarbons.

64. A method for the exploration of hydrocarbons according to claim 63 comprising the additional step of (h) displaying at least a portion of said stored plane of seismic attributes.

65. The process of claim 63, wherein at least steps (b) through (g) are digitally encoded as a set of instructions for programming a computer and further including the step of loading said instructions on said computer before performing steps (b) through (g).

66. A device adapted for use by a digital computer wherein a plurality of computer instructions defining the process of claim 65 are encoded, said device being readable by said digital computer, and said computer instructions programming said computer to perform said process.

67. The device of claim 66, wherein said device is selected from the group consisting of a magnetic tape, a magnetic disk, a magneto-optical disk, an optical disk and a CD-ROM.

68. A method for the exploration of hydrocarbons, wherein a stored plane of seismic attributes has been prepared by the method of claim 63, comprising:

(a) accessing said stored plane of seismic attributes; and, (b) displaying at least a portion of said stored plane of seismic attributes.

69. A method for the exploration of hydrocarbons, comprising:

(a) obtaining a set of spatially related seismic traces distributed over a surface of the earth, said seismic traces containing signals representative of subterranean structures and stratigraphy;

(b) selecting a target seismic trace having a surface location and at least two other seismic traces having surface locations from said set of seismic traces;

(c) calculating a complex similarity matrix from said selected seismic traces;

(d) calculating a seismic attribute from said complex similarity matrix;

(e) storing said seismic attribute at a position representative of the surface location of the target trace; and, (f) repeating steps (b) through (e) for at least two additional target traces, thereby creating a stored plane of seismic attributes, said stored plane of seismic attributes being used to identify subsurface structural and stratigraphic features that are conducive to the migration, accumulation, or presence of hydrocarbons.

70. A method for the exploration of hydrocarbons, wherein a stored plane of seismic attributes has been prepared by the method of claim 69, comprising:

(a) accessing said stored plane of seismic attributes; and, (b) displaying at least a portion of said stored plane of seismic attributes.

71. A method of geophysical exploration, comprising the steps of:

(a) obtaining a set of spatially related seismic traces distributed over a surface of the earth, said seismic traces containing signals representative of subterranean structures and stratigraphy;

(b) selecting a target seismic trace and at least two additional neighborhood seismic traces from said spatially related, said selected seismic traces being characterized by at least a surface location;

(c) calculating a similarity matrix from said selected seismic traces, said similarity matrix having a plurality of eigenvectors;

(d) calculating a particular eigenvector of said similarity matrix, said particular eigenvector containing eigenvector elements;

(e) associating each of said eigenvector elements with a surface location;

(f) fitting a function characterized by constant coefficients to said eigenvector elements and said surface locations, thereby obtaining one or more constant coefficient estimates;

(g) calculating a seismic attribute from any of said constant coefficient estimates so obtained;

(h) storing said seismic attribute at a position representative of the surface location of the target trace; and, (i) repeating steps (b) through (h) for at least two additional target traces, thereby creating a stored plane of seismic attributes, said stored plane of seismic attributes being used to identify subsurface structural and stratigraphic features that are conducive to the migration, accumulation, or presence of hydrocarbons.

72. A method for the exploration of hydrocarbons, wherein a stored plane of seismic attributes has been prepared by the method of claim 71, comprising:

(a) accessing said stored plane of seismic attributes; and, (b) displaying at least a portion of said stored plane of seismic attributes.

73. A method according to claim 1, wherein step (d) further includes the steps of:

(d1) calculating an analytic seismic trace from one of said selected at least three traces;

(d2) repeating step (d1) until at least three analytic seismic traces have been computed from at least three of said selected at least three traces; and, (d3) calculating a complex similarity matrix from any analytic seismic traces so calculated.

74. A method according to claim 69, wherein step (c) further includes the steps of:

(c1) calculating an analytic seismic trace from one of said selected at least three traces;

(c2) repeating step (c1) until at least three analytic seismic traces have been computed from at least three of said selected at least three traces; and, (c3) calculating a complex similarity matrix from any analytic seismic traces so calculated.

* * * * *

UNITED STATES PATENT AND TRADEMARK OFFICE
CERTIFICATE OF CORRECTION

PATENT NO. : 5,940,778
DATED : August 17, 1999
INVENTOR(S) : Marfurt et al.

It is certified that error appears in the above-identified patent and that said Letters Patent is hereby corrected as shown below:

Patent reads:

| Col. | Line |
|------|------|
| 19   | 18   |

$$\text{``}d_\eta[j] = \sum_{K=0}^{L-1} T[K+M_t, j] e^{-w_\eta K \Delta t},\text{''}$$

should read:

$$\text{``}d_\eta[j] = \sum_{K=0}^{L-1} T[K+M_t, j] e^{-iw_\eta K \Delta t},\text{''}$$

| 20 | 10 |

$$\text{``} -N_p \leq p \leq +N_p, \; -N_p \leq q \leq +N_q; \text{''}$$

should read:

$$\text{``} -N_p \leq p \leq +N_p, \; -N_q \leq q \leq +N_q; \text{''}$$

Signed and Sealed this

Sixteenth Day of May, 2000

Attest:

Q. TODD DICKINSON

*Attesting Officer*    *Director of Patents and Trademarks*